US011132779B2

(12) United States Patent
Parikh

(10) Patent No.: US 11,132,779 B2
(45) Date of Patent: Sep. 28, 2021

(54) JEWELRY ITEM GRADING SYSTEM AND METHOD

(71) Applicant: Aniket Parikh, Scarsdale, NY (US)

(72) Inventor: Aniket Parikh, Scarsdale, NY (US)

(73) Assignee: PARIKH HOLDINGS LLC, Scarsdale, NY (US)

( * ) Notice: Subject to any disclaimer, the term of this patent is extended or adjusted under 35 U.S.C. 154(b) by 131 days.

(21) Appl. No.: 16/678,043

(22) Filed: Nov. 8, 2019

(65) Prior Publication Data

US 2021/0142462 A1    May 13, 2021

(51) Int. Cl.
*G06T 7/00* (2017.01)
*G06T 7/62* (2017.01)
*G06T 7/90* (2017.01)

(52) U.S. Cl.
CPC .............. *G06T 7/0002* (2013.01); *G06T 7/62* (2017.01); *G06T 7/90* (2017.01); *G06T 2207/10024* (2013.01)

(58) Field of Classification Search
CPC ........... G06T 7/0002; G06T 7/62; G06T 7/90; G06T 2207/10024
USPC .......................................................... 382/162
See application file for complete search history.

(56) References Cited

U.S. PATENT DOCUMENTS

| | | | | |
|---|---|---|---|---|
| 2006/0062446 | A1* | 3/2006 | Porat | G01B 11/24 382/154 |
| 2010/0250201 | A1* | 9/2010 | Sivovolenko | G06T 17/10 703/1 |
| 2013/0085792 | A1 | 4/2013 | Klein | |
| 2014/0063485 | A1* | 3/2014 | Palmieri | G01N 21/87 356/30 |
| 2016/0006929 | A1* | 1/2016 | Gaywala | H04N 5/23229 348/135 |
| 2016/0203495 | A1* | 7/2016 | Koh | G06Q 10/06 705/317 |
| 2016/0232432 | A1* | 8/2016 | Regev | G06K 9/6202 |
| 2017/0370855 | A1 | 12/2017 | Takahashi | |
| 2018/0247399 | A1 | 8/2018 | Parikh et al. | |

(Continued)

OTHER PUBLICATIONS

International Search Report and Written Opinion dated Jan. 28, 2021 corresponding to International Patent Application No. PCT/US2020/058031; 13 pages.

(Continued)

*Primary Examiner* — Ali Bayat
(74) *Attorney, Agent, or Firm* — Leason Ellis LLP

(57) ABSTRACT

A method and system for grading a jewelry item is provided. The method includes: capturing an image of the jewelry item; analyzing the image to identify at least one of: one or more inclusions in the jewelry item, a color of the jewelry item, and one or more dimensions of the jewelry item; evaluating a quality of the jewelry item based on at least a subset of features including: one or more sizes of the one or more inclusions, one or more placements of the one or more inclusions, one or more color characteristics of the one or more inclusions, the color of the jewelry item, the one or more dimensions of the jewelry item, or a combination of the foregoing; and determining a grading of the jewelry item in which the quality of the jewelry item is quantified in relation to additional gradings concerning corresponding additional jewelry items.

17 Claims, 12 Drawing Sheets

(56) References Cited

U.S. PATENT DOCUMENTS

2020/0371042 A1* 11/2020 Sivovolenko ........ G01N 33/381
2021/0131974 A1* 5/2021 Ioffe .................. H04N 5/23299

OTHER PUBLICATIONS

Rapaport Mobile [retrieved from https://www.diamonds.net/mobile on Jul. 13, 2020].

* cited by examiner

| GEMSTONE | NUMERICAL GRADE | PRICE |
|---|---|---|
| GEMSTONE A | 55.00 | $1,512.00 |
| GEMSTONE B | 52.00 | $1,201.00 |
| GEMSTONE C | 51.00 | $1,170.00 |
| GEMSTONE D | 46.50 | $1,045.00 |
| GEMSTONE E | 43.20 | $980.00 |
| GEMSTONE F | 41.75 | $952.00 |

FIG. 7A

| GEMSTONE | NUMERICAL GRADE | PRICE |
|---|---|---|
| GEMSTONE A | 55.00 | $1,512.00 |
| GEMSTONE G | 52.00 | $1,204.00 |
| GEMSTONE B | 51.97 | $1,201.00 |
| GEMSTONE H | 51.01 | $1,173.00 |
| GEMSTONE C | 51.00 | $1,170.00 |
| GEMSTONE I | 46.50 | $1,047.00 |
| GEMSTONE D | 46.49 | $1,045.00 |
| GEMSTONE E | 43.20 | $980.00 |
| GEMSTONE F | 41.75 | $952.00 |

FIG. 7B

| GEMSTONE | NUMERICAL GRADE | PRICE |
|---|---|---|
| GEMSTONE A | 56.05 | $1,611.00 |
| GEMSTONE B | 53.02 | $1,285.00 |
| GEMSTONE C | 52.10 | $1,212.00 |
| GEMSTONE D | 47.60 | $1,076.00 |
| GEMSTONE E | 44.35 | $1,002.00 |
| GEMSTONE F | 43.05 | $975.00 |

FIG. 7C

JEWELRY ITEM GRADING SYSTEM AND METHOD

FIELD OF THE DISCLOSURE

The present disclosure relates generally to jewelry items, and more particularly to systems and methods for grading a jewelry item.

BACKGROUND OF THE DISCLOSURE

Jewelry items, such as diamonds and other gemstones, are often graded in an effort to provide some indication of their quality to interested parties such as buyers and sellers. The Gemological Institute of America (GIA) established the International Diamond Grading System and developed grading schemes for clarity, color, cut, and carat weight to standardize grading of diamonds. However, individual laboratories, jewelry stores, and other entities that grade and sell diamonds and other gemstones vary widely in how they apply the GIA's grading schemes, or any other grading scheme in use. One laboratory can assign a color grade of "G" to a diamond, and another laboratory can assign a color grade of "H" or "I" to the same diamond. One laboratory can assign a clarity grade of "SI1" to a diamond, and another laboratory can assign a clarity grade of "SI2" or "SI3" to the same diamond. The differences in grading can be based on subjective interpretations of the GIA schemes, can be motivated by a desire to grade gemstones more or less stringently, or can be attributed to any of a number of other factors. These factors are not only difficult to control, but their influence on the grading process is difficult to detect in the first place.

Some laboratories and other grading entities also change the way they apply grading schemes such as the GIA's over time, whether intentionally or otherwise. Laypersons and sellers of gemstones alike can receive different information about the gradings of particular gemstones depending on what entity did the grading. In these situations, laypersons and sellers find themselves without meaningful recourse to control for variations in grading and valuations performed by different entities, or even to know the existence and/or extent of such variations in the first place.

It is in regard to these and other problems in the art that the present disclosure is directed to provide a technical solution for an effective grading technique that accounts for the quality of a jewelry item while overcoming the problems inherent to current grading processes.

SUMMARY OF THE DISCLOSURE

According to an embodiment of the present invention, a method for grading a jewelry item is provided. The method includes: capturing, using an image capturing device, an image of the jewelry item; analyzing, using a processing unit, the image of the jewelry item to identify, within the image, at least one or one or more inclusions in the jewelry item, a color of the jewelry item, and one or more dimensions of the jewelry item; evaluating, using the processing unit, a quality of the jewelry item based on at least a subset of features including: one or more sizes of the one or more inclusions, one or more placements of the one or more inclusions, one or more color characteristics of the one or more inclusions, the color of the jewelry item, and the one or more dimensions of the jewelry item; and determining, using the processing unit, a grading of the jewelry item in which the quality of the jewelry item is quantified in relation to a plurality of additional gradings concerning a corresponding plurality of additional jewelry items, wherein the quantified grading is calculated with regard to differences in the evaluated quality of the subset of features of each respective jewelry item.

In an embodiment, the evaluating step takes into account at least two of the following: the one or more sizes of the one or more inclusions, the one or more placements of the one or more inclusions, and the one or more color characteristics of the one or more inclusions.

In an embodiment, the one or more color characteristics of the one or more inclusions include a visibility of one of the one or more inclusions in a first color light and a visibility of the one inclusion in a second color light.

In an embodiment, the one or more color characteristics of the one or more inclusions include a difference between a color of one of the one or more inclusions and a color of the jewelry item.

In an embodiment, the evaluating step takes into account the one or more placements of the one or more inclusions by taking into account at least one of the following: a proximity of a first one of the one or more inclusions to a second one of the one or more inclusions, a proximity of at least one of the first inclusion or the second inclusion to an edge of the jewelry item, and a proximity of at least one of the first inclusion or the second inclusion to a portion of the jewelry item that will be obscured during use of the jewelry item.

In an embodiment, the evaluating step includes: representing at least a portion of the jewelry item within a grid; and determining at least one of the one or more sizes of the one or more inclusions or the one or more placements of the one or more inclusions based on at least one of a number of subsections of the grid covered by the one or more inclusions or a proximity of subsections of the grid covered by the one or more inclusions.

In an embodiment, the evaluating step includes: representing one or more characteristics of each of at least two of the one or more inclusions using a first numerical string and a second numerical string, respectively; and performing calculations using the first numerical string and the second numerical string as part of the step of evaluating the quality of the jewelry item.

In an embodiment, the determining step includes updating at least one of the plurality of additional gradings concerning the plurality of additional jewelry items based on the grading of the jewelry item.

In an embodiment, the jewelry item is a first jewelry item, and the method further includes analyzing the plurality of additional gradings to identify a second jewelry item from among the plurality of additional jewelry items as being a jewelry item that is similar to the first jewelry item.

According to another embodiment of the present invention, a system for grading a jewelry item is provided. The system includes: an image capturing device configured to capture an image of the jewelry item; an external storage component configured to store data corresponding to the image of the jewelry item and of a plurality of additional jewelry items; and a processing unit configured to: analyze the image of the jewelry item to identify, within the image, at least one of: one or more inclusions in the jewelry item, a color of the jewelry item, and one or more dimensions of the jewelry item; evaluate a quality of the jewelry item based on at least a subset of features including: one or more sizes of the one or more inclusions, one or more placements of the one or more inclusions, one or more color characteristics of the one or more inclusions, the color of the jewelry item, and the one or more dimensions of the jewelry item; access, from the external storage component, data indicative of at least one of one or more inclusions in the plurality of additional jewelry items, one or more colors of the plurality of additional jewelry items, and one or more dimensions of the plurality of additional jewelry items in order to determine a plurality of additional gradings of the plurality of additional jewelry items; and determine a grading of the jewelry item that quantifies the evaluated quality of the jewelry item in relation to the plurality of additional gradings each concerning the plurality of additional jewelry items, wherein the quantified grading is calculated with regard to differences in the evaluated quality of the subset of features of each respective jewelry item.

In an embodiment, the processing unit is configured to take into account at least two of the following to evaluate the quality of the jewelry item: the one or more sizes of the one or more inclusions, the one or more placements of the one or more inclusions, and the one or more color characteristics of the one or more inclusions.

In an embodiment, the one or more color characteristics of the one or more inclusions include a visibility of one of the one or more inclusions in a first color light and a visibility of the one inclusion in a second color light.

In an embodiment, the one or more color characteristics of the one or more inclusions include a difference between a color of one of the one or more inclusions and a color of the jewelry item.

In an embodiment, the processing unit is configured to take into account at least one of the following so as to take into account the one or more placements of the one or more inclusions: a proximity of a first one of the one or more inclusions to a second one of the one or more inclusions, a proximity of at least one of the first inclusion or the second inclusion to an edge of the jewelry item, and a proximity of at least one of the first inclusion or the second inclusion to a portion of the jewelry item that will be obscured during use of the jewelry item.

In an embodiment, the processing unit is configured to: represent at least a portion of the jewelry item within a grid; and determine at least one of the one or more sizes of the one or more inclusions or the one or more placements of the one or more inclusions based on at least one of a number of subsections of the grid covered by the one or more inclusions or a proximity of subsections of the grid covered by the one or more inclusions.

In an embodiment, the processing unit is configured to update at least one of the plurality of additional gradings concerning the plurality of additional jewelry items based on the grading of the jewelry item.

In an embodiment, the jewelry item is a first jewelry item, and the processing unit is configured to analyze the plurality of additional gradings to identify a second jewelry item from among the plurality of additional jewelry items as being a jewelry item that is similar to the first jewelry item.

According to another embodiment of the present invention, a method for identifying similarly graded jewelry items is provided. The method includes: analyzing, using a processing unit, data indicative of at least one of: one or more inclusions in a first jewelry item, a color of the first jewelry item, and one or more dimensions of the first jewelry item; determining, using the processing unit, a grading of the first jewelry item that is indicative of a quality of the first jewelry item using a first grading technique that is based on the data indicative of the at least one of the one or more inclusions in the first jewelry item, the color of the first jewelry item, and the one or more dimensions of the first jewelry item; accessing, from a remote computing device, data indicative of a second jewelry item having a grading that is indicative of a quality of the second jewelry item and that is determined using a second grading technique that does not adhere to the first grading technique; and determining, using the processing unit, that when the grading of the second jewelry item is modified to adhere to the first grading technique, the modified grading of the second jewelry item that adheres to the first grading technique is within a threshold difference from the grading of the first jewelry item.

In an embodiment, determining that the modified grading of the second jewelry item is within the threshold difference from the grading of the first jewelry item includes: determining that modifying the grading of the second jewelry item, such that at least one of size, placement, or color characteristics of one or more inclusions in the second jewelry item are accounted for according to the first grading technique, results in the modified grading of the second jewelry item being within the threshold difference from the grading of the first jewelry item.

In an embodiment, determining the grading of the first jewelry item takes into account at least one of the following: a size of a first one of the one or more inclusions in the first jewelry item, a proximity of the first inclusion to a second one of the one or more inclusions in the first jewelry item, a proximity of at least one of the first inclusion or the second inclusion to an edge of the first jewelry item, a visibility of the first inclusion in a first color light, a visibility of the first inclusion in a second color light, and a difference between a color of the first inclusion and a color of the first jewelry item.

Any combinations of the various embodiments and implementations disclosed herein can be used. These and other aspects and features can be appreciated from the following description of certain embodiments of the invention and the accompanying drawings and claims.

BRIEF DESCRIPTION OF THE DRAWINGS

FIGS. 7A-7C illustrate example slottings of items relative to one another, according to an embodiment of the present invention.

DETAILED DESCRIPTION OF CERTAIN EMBODIMENTS OF THE DISCLOSURE

Figure 1:
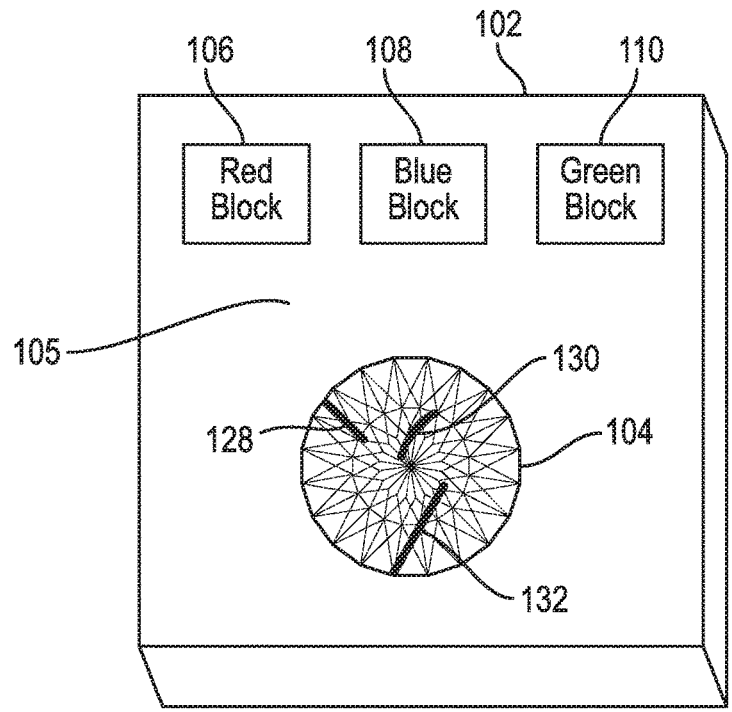
FIG. 1 is a diagram of an example system for grading a jewelry item such as a gemstone, according to an embodiment of the present invention.
Figure 1:
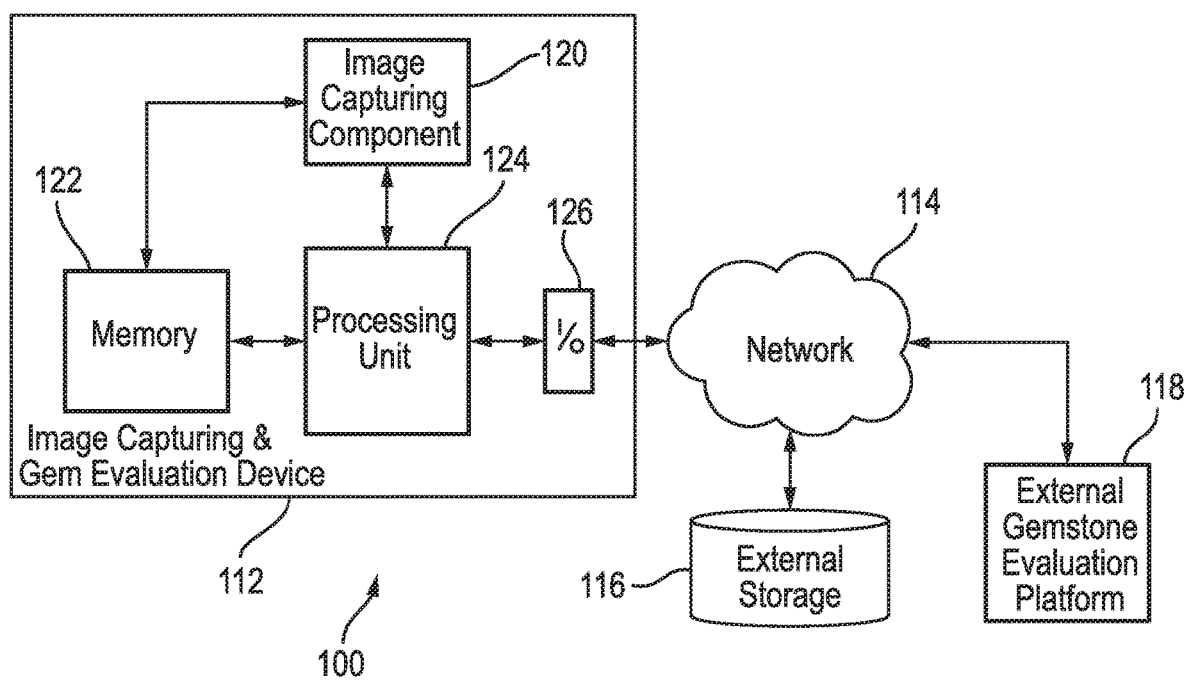

Example embodiments of the present disclosure are directed to a system and method for grading a jewelry item. The jewelry item can include a gemstone set in an item such as a ring or pendant. In some cases, the jewelry item is or includes a loose gemstone that is not set. In some such embodiments, an image of a jewelry item is captured and analyzed so that quality of the jewelry item can be evaluated based on objective features. For example, quality of the jewelry item can be evaluated based on inclusions contained in the jewelry item and characteristics of those inclusions. Characteristics of the inclusions can include objectively ascertainable criteria such as sizes of inclusions, proximity of inclusions to one another, proximity of inclusions to portions of a jewelry item that are less visible and/or are able to be obscured by a prong, and/or any other suitable characteristics. Quality of the jewelry item can also be evaluated based on factors such as color of the jewelry item, color of inclusions relative to color of the jewelry item, dimensions and/or size of the jewelry item, shape or shapes of the jewelry item, facets of the jewelry item (e.g., characteristics of one or more facets that can be identified using the techniques described herein), and/or any other suitable factors.

In various example embodiments, a grading of a jewelry item performed using a different grading standard can be modified using information regarding the different grading standard in order to conform to an objective grading standard that can be implemented using the techniques described herein. When modification of the grading of such a jewelry item occurs, it can be determined whether such a jewelry item is similar to other jewelry items that have been graded using the techniques described herein, and vice versa.

Information regarding jewelry items that have been graded according to the present techniques, or that have had gradings according to different techniques modified, can be accessible for comparisons between jewelry items and identification of jewelry items of similar quality. Jewelry items are "slotted" into a ranking relative to one another, and the slotting (i.e., ranking) of the jewelry items can be dynamically updated each time a new jewelry item is graded, so that the jewelry items remain ranked relative to one another in a quantitative manner that takes into account objective grading applied to each of the jewelry items. Sellers, and laypersons such as buyers, can take advantage of the present techniques to overcome uncertainties previously created by the use of grading standards that are subjective and that differ from one another in ways that are unable to be ascertained.

As further discussed herein, the grading techniques of the present disclosure can be used in grading based on inclusions that are physically present in a jewelry item, and to implement grading that accounts for shadows and/or reflections that appear to be inclusions. The shadows and/or reflections can be reduced or removed using certain techniques such as those described with respect to FIG. 4C, and thus can be distinguished from inclusions physically present in a jewelry item.

FIG. 1 is a diagram of an example system 100 for grading a jewelry item such as a gemstone, according to an embodiment of the present invention. The system 100 includes a jewelry container 102. As shown in FIG. 1, a gemstone 104 (the gemstone 104 and any other gemstone discussed herein being referred to herein at times as a "gem" or "stone") and color references can be situated on a surface 105 inside the jewelry container 102, with the top of the jewelry container 102 being open and FIG. 1 illustrating a simplified overhead view of the gemstone 104. In another embodiment, the gemstone 104 can be already mounted in a setting and thus is not situated inside the jewelry container 102, but can still be analyzed in accordance with the techniques described below.

In the example of FIG. 1, the color references include a red reference block 106, a blue reference block 108, and a green reference block 110. According to an embodiment, the surface 105 can be a cotton surface that provides a relatively white backdrop against which images of the gemstone 104 and color reference blocks 106-110 can be captured. In another embodiment, a different color backdrop can be used. Additionally or alternatively, in another embodiment, multiple gemstones can be situated inside the jewelry container 102, and can be analyzed at the same time in accordance with the techniques described herein.

In some embodiments, the system 100 does not include the color reference blocks 106-110, and color and size characteristics of the gemstone 104 are determined without reference to the captured image(s). For example, the captured image(s) of the gemstone 104 can be used to identify and analyze inclusions, as further described below, and color and size characteristics of the gemstone 104 are then determined according to alternative techniques such as one of the techniques described with reference to FIGS. 4B and 4C.

The system 100 also includes an image capturing and gem evaluation device 112, a network 114, external storage 116, and an external gemstone evaluation platform 118. The image capturing and gem evaluation device 112 includes an image capturing component 120, a memory 122, a processing unit 124 such as a microcontroller or microprocessor, and an input/output (I/O) circuit 126. The gemstone 104 contains one or more inclusions, which are illustrated in FIG. 1 as a first inclusion 128, a second inclusion 130, and a third inclusion 132.

The image capturing and gem evaluation device 112 can be any suitable device containing the image capturing component 120 and configured to capture and process one or more images of the gemstone 104 as described herein. In some embodiments, the image capturing and gem evaluation device 112 is a mobile phone, and the image capturing component 120 is a mobile phone camera. In other embodiments, the image capturing and gem evaluation device 112 include a macro lens, laser technology, or other suitable components to improve image quality. The memory 122 can be or can include a program memory and/or a random access memory (RAM), and stores image data received from the image capturing component 120 for processing by the processing unit 124.

The processing unit 124 processes the image data as described herein to evaluate the gemstone 104 and/or to facilitate identification of a similarly graded jewelry item via the I/O circuit 126 (e.g., a transceiver), the network 114, the external storage 116, and/or the external gemstone evaluation platform 118. In some embodiments in which the system 100 does not include the color reference blocks 106-110, the processing unit 124 implements filtering techniques on the captured image, and/or can invert colors in the captured image, in order to facilitate identification of color characteristics as discussed below.

The network 114 can be a network such as the Internet, a cellular network, and/or any other type of suitable network (e.g., a local area network (LAN), a metropolitan area network (MAN), a wide area network (WAN), a mobile network, a wired or wireless network, etc.). The external gemstone evaluation platform 118 can be any suitable platform operated or otherwise controlled by an entity such as a gemstone dealer, a user that grades gemstones, or a gemstone evaluating entity such as a laboratory that evaluates gemstones to determine gradings and pricings used in sales of gemstones. The external storage 116 can be any suitable database or other storage component(s) operated or otherwise accessible by such an entity.

Figure 2A:
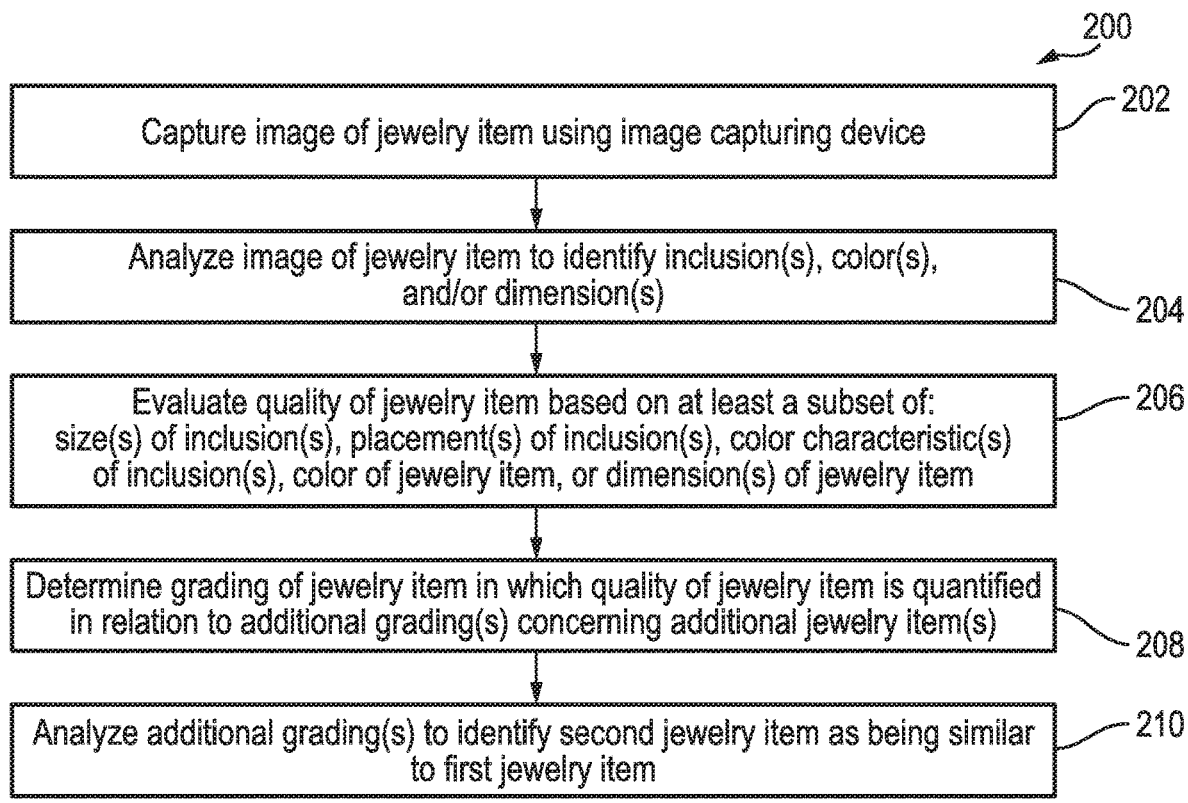
FIG. 2A is a flow chart of an example method for grading a jewelry item, according to an embodiment of the present invention.

FIG. 2A is a flow chart of an example method 200 for grading a jewelry item, such as the gemstone 104, according to an embodiment of the present invention. The method 200 and other methods disclosed herein can be implemented by and/or used by the system 100 of FIG. 1. Some or all of the method 200 and other methods disclosed herein can be performed using components and techniques illustrated in and described with reference to FIGS. 1, 3A-3B, 4A-4C, 5A-5B, 6A-6D, and 7A-7C.

Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 200 (or other disclosed methods) to be carried out. It should be noted that in other embodiments, the order of the operations can be varied, and that some of the operations can be omitted. The electronics can also include a user interface equipped with a touch screen (e.g., a touch screen of the image capturing and gem evaluation device 112, such as a touch screen of a mobile phone) to permit computer interaction.

In the example method 200, processing begins with capturing 202 an image of the jewelry item using an image capturing device. In some embodiments, this can be performed using the image capturing component 120, such as in response to a user of the image capturing and gem evaluation device 112 taking a photo of the gemstone 104. In some embodiments, the capturing 202 includes capturing two or more images of the jewelry item. The two or more images can be taken from one or multiple angles, such as from above the jewelry item, in line with a table of the jewelry item, from below the jewelry item, and/or from any other suitable vantage point. The digital data in the two or more images are stitchable together for analysis according to the techniques described herein. In another example, data is extracted and analyzed from the images separately, or from a three-dimensional composite image created from the separate images.

Figure 4A:
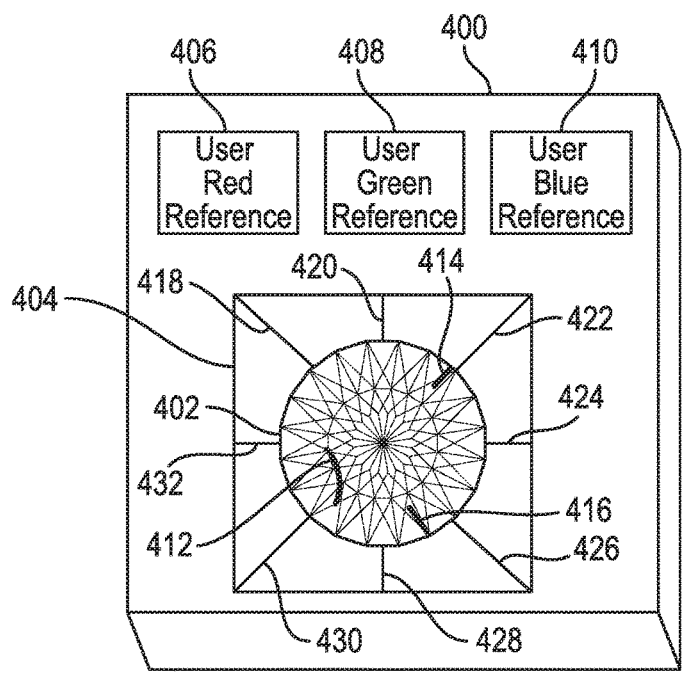
FIGS. 4A-4C illustrate example arrangements for capturing images of jewelry items and inclusions and analyzing colors and color characteristics of items and inclusions, according to an embodiment of the present invention.
Figure 4B:
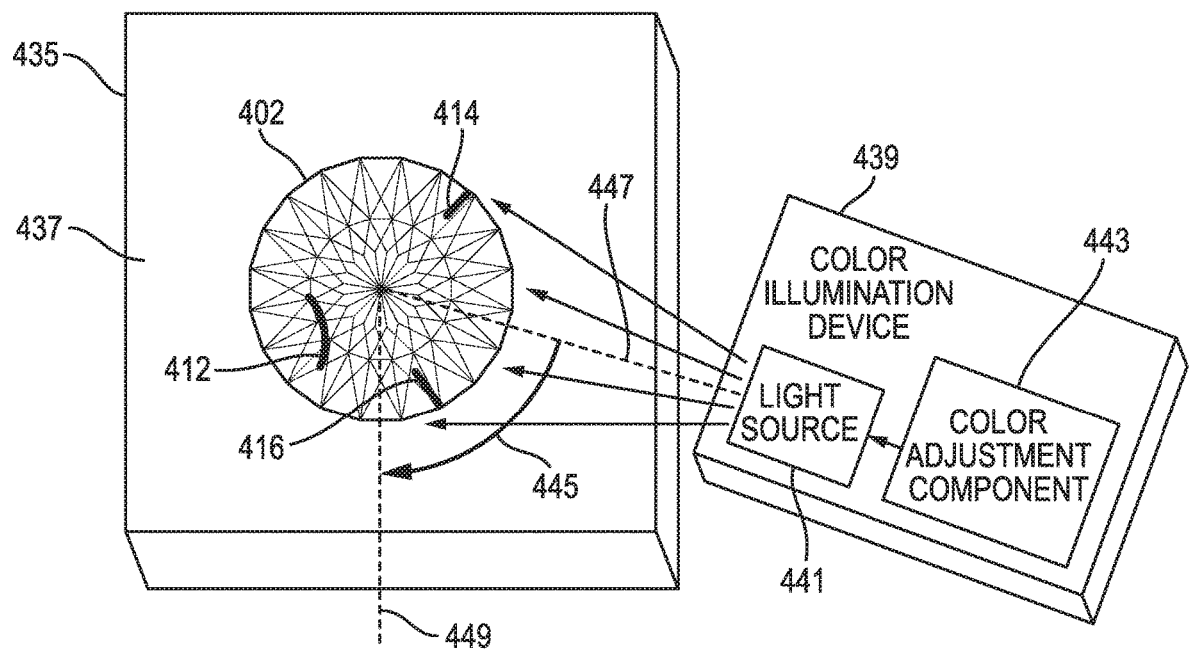
Figure 4C:
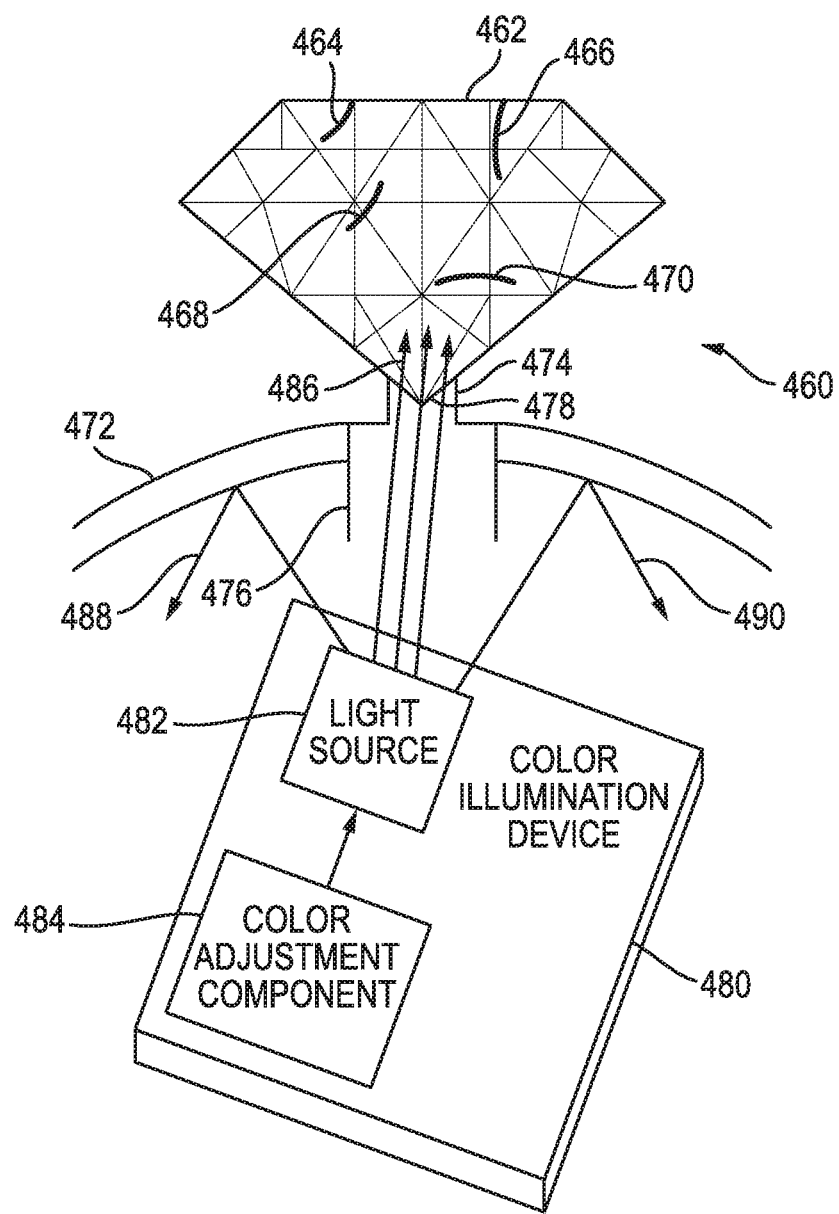

In some embodiments, the capturing 202 of one or more images is performed without color reference blocks (e.g., the color reference blocks 106-110), and color characteristics are analyzed for grading in accordance with techniques described elsewhere herein, such as with reference to FIGS. 4B and 4C. In other embodiments, the capturing 202 of the one or more images is performed by receiving one or more user-provided images of the gemstone.

The method 200 also includes analyzing 204 the captured image of the jewelry item to identify one or more inclusions in the jewelry item, one or more colors of the jewelry item, and/or one or more dimensions of the jewelry item. The analyzing 204 additionally can be performed to identify characteristics of the jewelry item such as a volume, a weight, a shape or shapes of the jewelry item, one or more facets of the jewelry item, one or more characteristics of the facet(s) such as a shape and/or dimensions of the facet(s), and/or any other desired characteristics. The analyzing 204 is implementable using neural networks, machine learning, or any other suitable technique for identifying one or more of the aforementioned features of a jewelry item and/or any other desired features.

More particularly, in some embodiments and as discussed in greater detail below, the identification of the one or more inclusions can include using a neural network to identify a size(s) of the inclusion(s), a placement(s) of the inclusion(s), and/or a color characteristic(s) of the inclusion(s). Identification of an inclusion(s) and a characteristic(s) thereof in such embodiments uses edge detection or other suitable technologies. Additionally, other characteristics of the gemstone such as dimensions, shapes, facets, characteristics of facets, color, volume, and/or type of gemstone can be similarly identified using neural networks. The specific density of the gemstone is determinable based on the identified type of the gemstone, and the specific density and volume of the gemstone can be used to further determine a weight of the gemstone.

The method 200 additionally includes evaluating 206 a quality of the jewelry item based on at least a subset of features of the jewelry item. The subset of features can include one or more of: (1) the size(s) of the inclusion(s) in the jewelry item, (2) the placement(s) of the inclusion(s), (3) the color characteristic(s) of the inclusion(s), (4) the color of the jewelry item, (5) the dimension(s) of the jewelry item, or (6) a combination of the foregoing. The evaluating 206 can be further based on any additional features of the jewelry item, such as shapes of the jewelry item, facets, characteristics of facets, etc. Example techniques for performing the evaluating 206 are further discussed below. As also further discussed below, the evaluated quality of the jewelry item can be used to grade the jewelry item (e.g., numerically) and the grading of the jewelry item can be compared against gradings of other jewelry items, where such a comparison optionally is dynamically updated using the techniques disclosed herein. In this manner, various embodiments of the present invention establish gradings of jewelry items that take into account relative quality of jewelry items and that are advantageously dynamic in nature to account for newly graded jewelry items, changes or variations in standards used to grade jewelry items, etc.

The method 200 further includes determining 208 a grading of the jewelry item in which the evaluated quality of the jewelry item is quantified in relation to additional gradings concerning corresponding additional jewelry items. The additional jewelry items can be or include jewelry items evaluated by any suitable entity or entities, such as the GIA, a user with a grading certificate, and/or a dealer that maintains a database of evaluated jewelry items.

In an example, the quality of the jewelry item can be quantified as a number between 0 and 100, and any suitable number of additional jewelry items can also have respective gradings quantified as numbers between 0 and 100. The quantified grading of the jewelry item is calculated with regard to differences in the quality of the jewelry item as compared to each of the additional jewelry items, as determined by the evaluating 206 based on features such as inclusion size(s), inclusion placement(s), inclusion color characteristic(s), jewelry item color, jewelry item dimensions, jewelry item shapes, jewelry item facets, and/or a characteristic(s) of a facet(s). In this manner, a set of jewelry items is "slotted" into objective rankings against one another. This ranking, or "slotting," facilitates identifying jewelry items similar to an evaluated jewelry item, e.g. similar to the gemstone 104, as further discussed below. Because the jewelry items can be slotted according to any one or more desired characteristics, jewelry items that are similar to the evaluated jewelry item in any one or more desired aspects can be identified according to the techniques described herein.

In some embodiments, and as further described below with reference to FIGS. 2B and 7A-7C, the determining step 208 includes updating at least one of the additional gradings concerning the additional jewelry items based on the grading of the jewelry item for which the capturing 202, analyzing 204, and evaluating 206 are performed. In this manner, whenever a new jewelry item is graded using the method 200, the jewelry item is assigned an objective grading in accordance with the techniques described herein and is slotted among previously graded jewelry items. The gradings previously assigned to other jewelry items are dynamically updated so that all of the jewelry items are assigned gradings (e.g., numerical grades, as described herein) relative to one another, according to various embodiments.

In some embodiments, the method 200 further includes analyzing 210 the additional gradings concerning the additional jewelry items to identify a jewelry item from among the additional jewelry items as being similar to the jewelry item for which the capturing 202, analyzing 204, evaluating 206, and determining 208 are performed. For example, information regarding each of the additional jewelry items can be stored in the external storage 116, and the jewelry item identified as similar are identified from such stored information. Identification of a similar jewelry item is further described below with reference to FIGS. 2B, 6D, and 7A-7C.

Figure 3A:
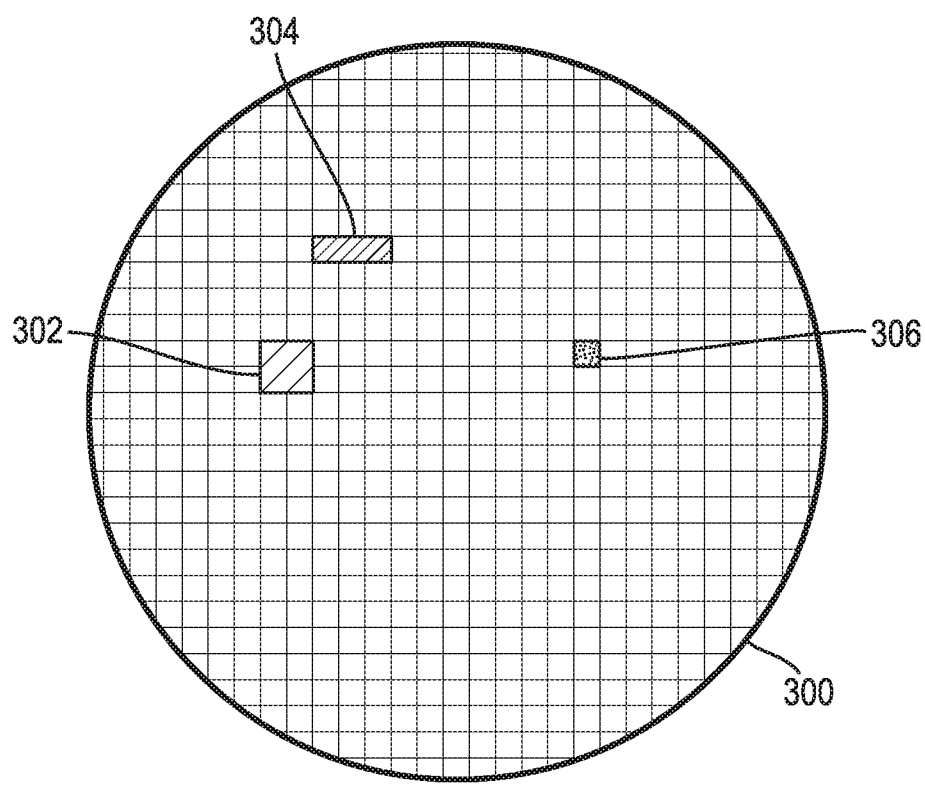
FIGS. 3A-3B illustrate example grids that can be used to represent inclusions in a jewelry item, according to an embodiment of the present invention.

With continued reference to FIG. 2A, and turning also to FIG. 3A, examples of some of the calculations that can be used in the evaluating 206 of the quality of the jewelry item are now described in greater detail. These calculations produce quantitative indications of the quality of the jewelry item, which can be used in the determining 208 of the grading. Some or all of the calculations can instead be performed as part of the determining 208 of the grading. A suitable portion of the gemstone 104 as captured using the image capturing and gem evaluation device 112 can be represented using a grid 300, as shown in FIG. 3A, according to an embodiment of the present invention. For example, the grid 300 can represent the table of the gemstone 104. In another example, a larger grid can be used to represent the table and the table facets of the gemstone 104. More generally, any desired shape or size of grid can be used, any desired number of grids can be used, and any desired shape of subsections of a grid can be used in order to represent inclusions as desired and perform calculations so as to account for inclusions in a desired manner.

The evaluating 206 can include the processing unit 124 mapping inclusions identified during the analyzing 204 to subsections of the grid 300. This can take into account a size and color of each inclusion by representing darker inclusions on the grid 300 such that they are weighted more heavily in various calculations described herein as compared to lighter inclusions. Color characteristics of inclusions are further discussed below with respect to FIGS. 4A-4C and 5A-5B.

In the particular example of FIG. 3A, the grid 300 can be used to represent locations, sizes, and colors of a first inclusion 302, a second inclusion 304, and a third inclusion 306. The first inclusion 302 is represented with hatching that is lighter relative to the hatching representing the second inclusion 304, whereas the third inclusion 306 is represented with a more solid appearance. These relative representations can thus indicate that the third inclusion 306 is darker than the second inclusion 304, which is darker than the first inclusion 302. Furthermore, in the example of FIG. 3A, the third inclusion 306 is the smallest and the first inclusion 302 is the largest, as indicated by their differing sizes on the grid 300.

The evaluating 206 can use any suitable calculations to assess the quality and/or grade of the jewelry item as impacted by inclusions such as those represented in FIG. 3A. For example, a percentage of the squares (or other shapes) comprising the grid that correspond to inclusions can be determined. The calculations can also account for the representations of different darkness of inclusions such as the differing representations used for the first, second, and third inclusions 302, 304, and 306. The calculations can also account for the placement of the inclusions relative to an edge of the grid 300 (e.g., relative to the circumference of the circle that encloses the grid 300) as opposed to the center of the grid 300. The calculating can account for any combination of the foregoing.

To provide several more particular examples, the light blockage of an inclusion x can be represented as $B_x$, which can be expressed as a percentage of incident light blocked by the inclusion x. For example, the first inclusion 302 might block 35% of incident light from transmission through the gemstone 104, so calculations can be made with $B_1=35$. Similarly, as an example, the second inclusion 304 might block 50% of incident light, so $B_2=50$, and the third inclusion 306 might block 100% of incident light, so $B_3=100$.

$M_x$ can be an edge proximity multiplier of inclusion x, where $M_x$ can be lower for inclusions near the edge of the table of the gemstone 104 and higher for inclusions near the center of the table. Any suitable multipliers can be utilized in accordance with the techniques described herein. In one example, $M_1=60$, $M_2=40$, and $M_3=60$, in a situation where the second inclusion 304 is located further from the center than the first and third inclusions 302 and 306.

The calculations utilized by the techniques described herein can assign a weighting to each inclusion, which can be represented as $W_x$. In some embodiments, the weighting of inclusion x can be proportional to the product of the light blockage of inclusion x and the edge proximity multiplier of inclusion x, such that $W_x=B_x*M_x$. Thus, using the examples provided above, $W_1=35*60=2100$ and $W_2=50*40=2000$. Accordingly, the second inclusion 304 can be considered to have less impact on the quality of the jewelry item than the first inclusion 302, because while the second inclusion 304 blocks more light, the second inclusion 304 can be sufficiently further from the center of the gemstone 104 than the first inclusion 302.

The calculations utilized by the techniques described herein can also take into account a distance between two inclusions, where $D_{x,y}=$ the distance between inclusion x (e.g., the first inclusion 302) and inclusion y (e.g., the second inclusion 304). The distance can be represented in any suitable units. A composite weighting $W_{x,y}$ of inclusions x and y can be defined as $W_{x,y}=(B_x*M_x)*(B_y*M_y)/D_{x,y}$. In this manner, the composite weighting of two inclusions is higher when the distance between them is smaller, as the two inclusions can create more undesirable visual effects when close together. The calculations herein can be expanded to cover any suitable number of inclusions. As such, determining a composite weighting of inclusions can reflect the combined impact of multiple inclusions on the quality and grading of the jewelry item.

Figure 3B:
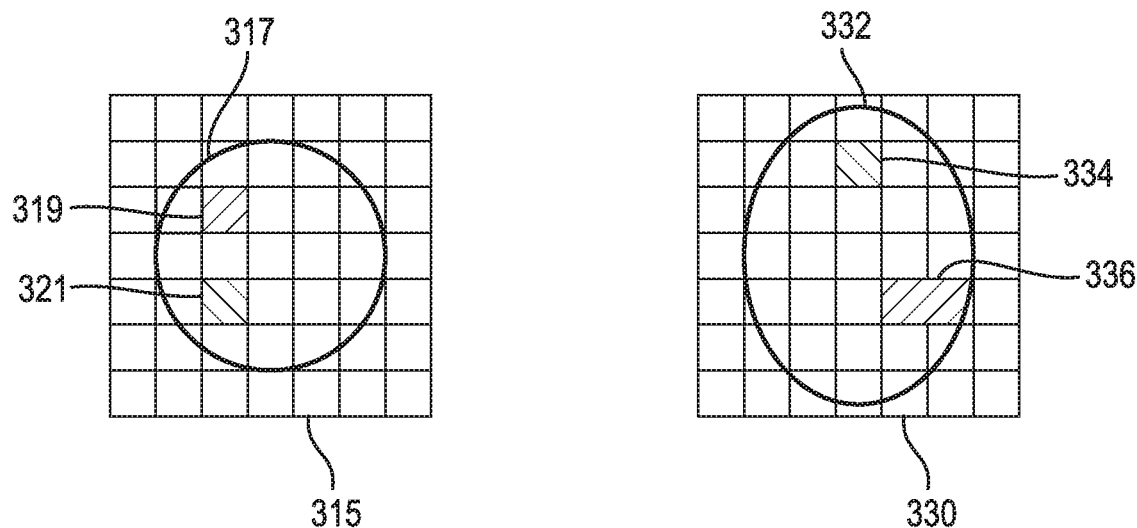

The grid 300 can have any suitable number of subsections corresponding to, for example, the table of the gemstone 304, and calculations and parameters such as those discussed above can be adjusted accordingly. Turning to FIG. 3B, in some embodiments where inclusions are represented on a grid, the grid can have a predetermined number of subsections with predetermined dimensions, without regard to the size of the table of the gemstone 304. Thus, for example, differently shaped and/or sized jewelry items can have similar plotting and inclusion mapping techniques applied thereto via use of a similar grid. More generally, differently shaped and/or sized jewelry items can thus have similar quality evaluation and grading methods applied thereto.

As a more particular example, FIG. 3B shows a second grid 315 corresponding to a second jewelry item cross-section (e.g., table) 317, with the second jewelry item having two inclusions 319 and 321 represented on the second grid 315. FIG. 3B also shows a third grid 330 corresponding to a third jewelry item cross-section (e.g., table) 332, with the third jewelry item having two inclusions 334 and 336 represented on the third grid 330. The third jewelry item might be more elliptically-shaped than the second jewelry item, as shown by the third jewelry item cross-section 332. However, evaluations of quality of the second jewelry item and third jewelry item that take into account, for example, an area of a respective grid that corresponds to inclusions, can be made without regard to jewelry item shape and/or size by using the same dimensions for the second grid 315 and the third grid 330.

The evaluating 206 of the quality of the jewelry item as described herein can also account for whether an inclusion is sufficiently close to the edge of the table of a jewelry item, or to any surface, that the visual impact of the inclusion will be lessened if the table size is reduced by appropriate cutting of the jewelry item. The evaluating 206 of the quality of the jewelry item can also or alternatively account for whether an inclusion is located at or in proximity to an edge or other portion of the jewelry item that will be obscured during use (e.g., wearing) of the jewelry item, such as proximate to an area of the jewelry item that might be obscured by a prong. As one example, the second inclusion 336 on the third grid 330 can be determined to be capable of being reduced in effect through cutting and/or by being obscured by a prong.

In other embodiments, the jewelry item or a portion thereof can be represented using a number. In certain embodiments the number is a string such as a binary or hexadecimal string, and the string can be analyzed in a suitable manner to perform the techniques described herein. For example, in such embodiments, each subsection (e.g., square) of a grid or within a portion of the grid, such as the first, second, or third grid 300, 315, or 330, is assigned the number "0" or "1." In an embodiment, a subsection is assigned the number "1" when it corresponds to an inclusion or portion thereof that blocks at least a threshold percentage of light, such as at least 50% of incident light, and is assigned the number "0" when the subsection does not correspond to such an inclusion or portion thereof.

One or more binary strings that result from the assignment of binary values to subsections of the grid can be analyzed or "read" in any direction (e.g., left to right, right to left, top to bottom, etc.) in order to represent and account for the darkness, placement, and/or other characteristics of an inclusion in a desired manner. In the case of decimal or hexadecimal numbers, some examples include assigning a grid subsection a higher number when the subsection corresponds to a darker inclusion that blocks more light, a higher number when the subsection corresponds to an inclusion that is closer to the center of the jewelry item as opposed to being close to the edge of the table, and a higher number when the subsection corresponds to an inclusion that is close to another inclusion and is thus more noticeable. Thus, the value of a binary or hexadecimal string can depend on the size or placement of an inclusion, in addition to depending on the direction from which the string is processed. In other examples where decimal or hexadecimal numbers are used, each decimal or hexadecimal number can indicate multiple variables, such as inclusion size, placement, and darkness.

In any event, one or more strings can be analyzed using suitable mathematical techniques, such as by weighting one or more strings as they are read in different directions. More generally, the use of binary, hexadecimal, etc. values based on correspondence of subsections to inclusions, light performance, or any other desired characteristic of a jewelry item can be implemented in any suitable manner to implement the evaluating 206 of the quality of the jewelry item. In view of the discussion elsewhere herein, use of binary, hexadecimal, etc. values in this manner facilitates objective grading of a jewelry item and slotting of the jewelry item into a rank compared to other jewelry items.

As discussed above, the evaluating 206 of the quality of the jewelry item can additionally or alternatively be based on one or more color characteristics of the one or more inclusions, the color of the jewelry item, and/or one or more dimensions of the one or more inclusions. Referring back to FIG. 1, the gemstone 104 can be located within the jewelry container 102 on the surface 105, which provides a white (neutral) backdrop for capturing of the image of the gemstone 104. In other examples, a different color that helps enhance visibility of the jewelry item can be used.

The color reference blocks 106-110 each have known colors that can, in some examples, be quantified as hexadecimal color values. When the capturing 202 is performed, the image that is captured includes therein the gemstone 104 and the color reference blocks 106-110. The analyzing 204 of the captured image includes processing the captured image to determine one or more color values of the gemstone 104, and these color values are then compared to the values of the color reference blocks 106-110 to determine the color of the gemstone 104 for use in the evaluating 206 of the quality of the gemstone 104. While the color reference blocks 106-110 are in some examples red, green, and blue, any suitable colors can be used. The jewelry item color can also be determined by analyzing the color of the jewelry item with respect to the white (or other color) backdrop on which the jewelry item is positioned.

A neural network can be used to remove the backdrop provided by the surface 105. In a particular embodiment, a trained neural network identifies the jewelry item, removes shadows, determines a mask outlining the gem, and implements a histogram of colors of the jewelry item inside the mask. The trained neural network can also implement a histogram of the color reference blocks 106-110 in order to take into account and remove any lighting variations, reflections, or flashes emitted from the jewelry item.

Turning to FIG. 4A, an alternative jewelry container 400 is shown that can be utilized with the system 100 and the techniques described herein. The jewelry container 400 contains a gemstone 402. The gemstone 402 can be situated on a paper 404, and the jewelry container 400 can include color reference blocks supplied by a user, such as a user of the image capturing and gem evaluation device 112. The user-supplied color reference blocks can include a red user reference block 406, a green user reference block 408, and a blue user reference block 410. The user can provide color values associated with these reference blocks before, for example, the capturing 202 and the analyzing 204. For example, the user can provide these values by capturing a preliminary image and the color values can be determined with the use of neural networks. In another example, the user can enter the color values into a mobile device app that implements some or all of the functionality described herein.

As also shown in FIG. 4A, the gemstone 402 typically contains inclusions 412, 414, and 416. Dimensions of the gemstone 402 and/or the inclusions 412-416 can be determined with reference to the paper 404, which can have one or more lines of known thickness and length printed thereon. For example, the paper 404 can have lines 418-432 printed thereon. The analyzing 204 includes processing the captured image to determine one or more dimensions of the gemstone 402 by comparing image data corresponding to the gemstone 402 to one or more of the lines 418-432. The paper 404 can be flat, or in other examples can be folded at one or more locations to assist in placement of the jewelry item on the paper 404. In certain embodiments, the paper 404 and/or the lines 418-432 printed thereon are also or alternatively used to determine one or more shapes of the gemstone 402 and/or one or more characteristics of one or more facets of the gemstone 402.

In certain embodiments, the paper 404 is replaced by a paper, plastic sheet, or other suitable material covering at least part of a light source placed below the gemstone 402, and one or more lines similar to the lines 418-432 are printed on the paper, plastic sheet, etc. covering at least part of the light source. The light source can be placed below the gemstone 402. When the gemstone 402 is illuminated, the appearance of the line(s) from such a paper, plastic sheet, etc., such as a reflection(s) of the line(s), can be used in determining characteristics such as gemstone dimensions, shapes, facet characteristics, inclusion characteristics, etc.

Color reference blocks such as the user-supplied reference blocks 406-410 can be of known size, or a user can enter their size into a mobile phone app or in another suitable way, so that the analyzing 204 determines dimensions of the gemstone 402 by comparing a size of the gemstone 402 in the captured image to sizes of the user-supplied reference blocks 406-410. Where the color reference blocks 106-110 are used, their sizes can be similarly known and used to determine gemstone dimensions. In another example, a coin or other object of known size can be used and included in the captured image to determine gemstone dimensions. Reference objects, whether user-supplied or provided as the color reference blocks 106-110, are in some embodiments also used in determining one or more shapes of the gemstone 402 and/or one or more characteristics of one or more facets of the gemstone 402, such a dimension(s) of the facet(s).

In some embodiments, the lines 418-432 on the paper can also be used to determine light transmission through the gemstone 402. For example, it can be determined whether any portions of the lines 418-432 are visible through the gemstone 402 (not shown as such in FIG. 4A). The degree of visibility of the lines 418-432 through the gemstone 402 when viewed from above the gemstone 402 can indicate the light transmission characteristics of the gemstone 402 for use in the evaluating 206, for example. More particularly, one or more of the lines 418-432 can refract and/or reflect such that when viewed from above the gemstone 402, the one or more of the lines 418-432 indicates light transmission characteristics of the gemstone 402.

FIG. 4B illustrates another alternative jewelry container 435 that contains the gemstone 402 situated on a surface 437 with no color reference blocks. Instead, a color illumination device 439 (which can be an implementation of or be incorporated into the image capturing and gem evaluation device 112) is used to illuminate the gemstone 402 with light of varying, but known, colors from outside (e.g., above) the jewelry container 435. For example, the color illumination device 439 can include a light source 441 and a color adjustment component 443 used to adjust the color of ambient light from the light source 441. In some examples, the light source 441 is an ultraviolet light source or a light source that is capable of emitting ultraviolet light and visible light at different settings. In some embodiments, the analyzing 204 of the captured image of the gemstone 402 includes determining a fluorescence intensity of the gemstone 402 and/or any other desired inherent properties of the gemstone 402 based on appearance of the gemstone 402 when illuminated by the light source 441, and the evaluating 206 of the quality of the gemstone 402 can take into account the determined fluorescence intensity.

The analyzing 204 of the captured image of the gemstone 402 can also include determining an angle 445 between ambient light 447 from the color illumination device 439 and reflected light 449 from the gemstone 402 in order to determine light reflection characteristics of the gemstone 402. Additionally, the capturing 202 of an image includes capturing an image of the gemstone 402 with a known color of light from the color illumination device 439 ambient upon the gemstone 402, and can include the use of flash photography, augmented reality, three-dimensional imaging, and/or other visual enhancements. The analyzing 204 includes determining one or more colors of the gemstone 402 by analyzing the appearance of the gemstone 402 in the ambient light of the known color.

Figure 5A:
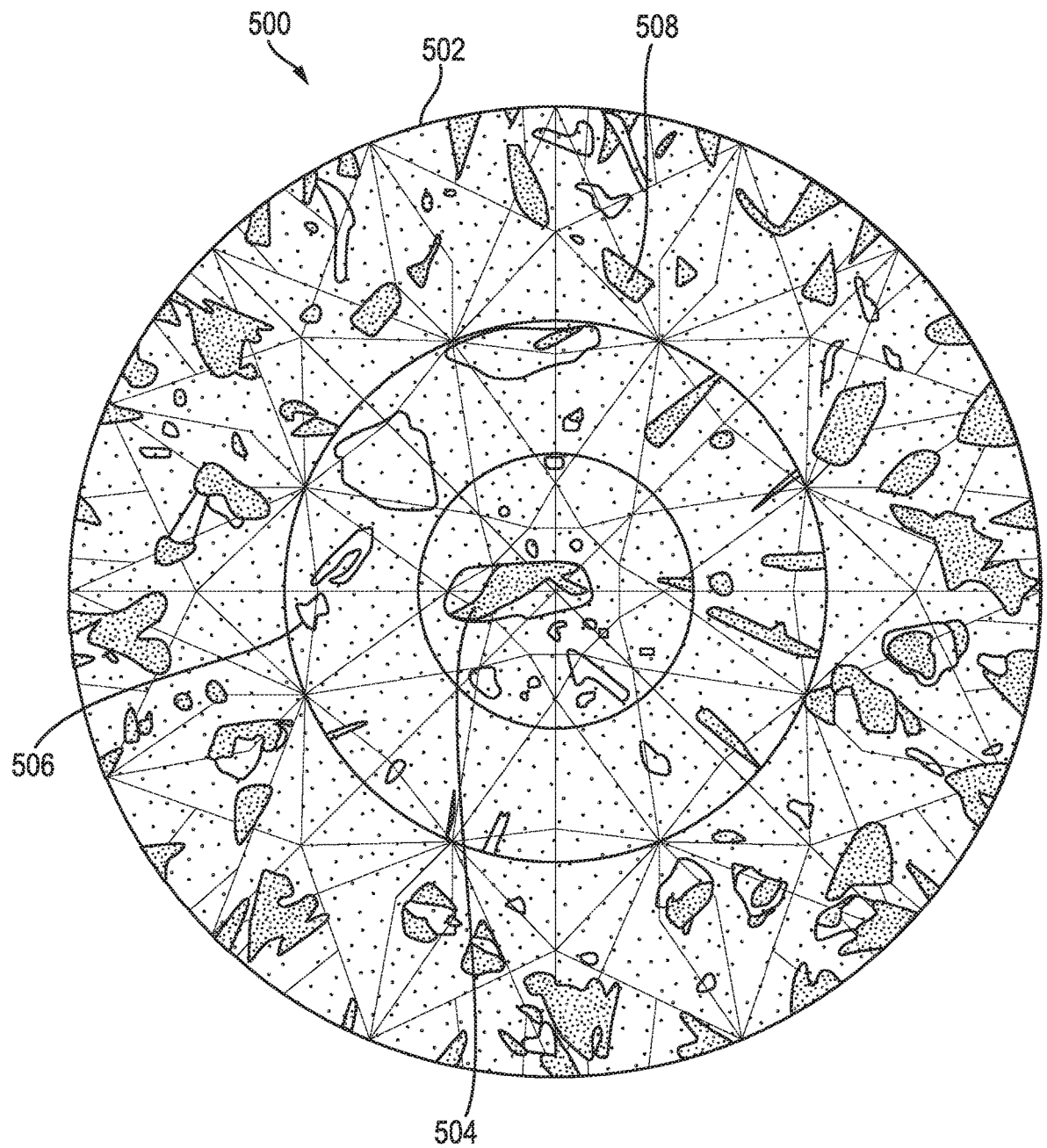
FIGS. 5A-5B illustrate differing appearances of a jewelry item and inclusions contained therein when illuminated by differing colors of light, according to an embodiment of the present invention.
Figure 5B:
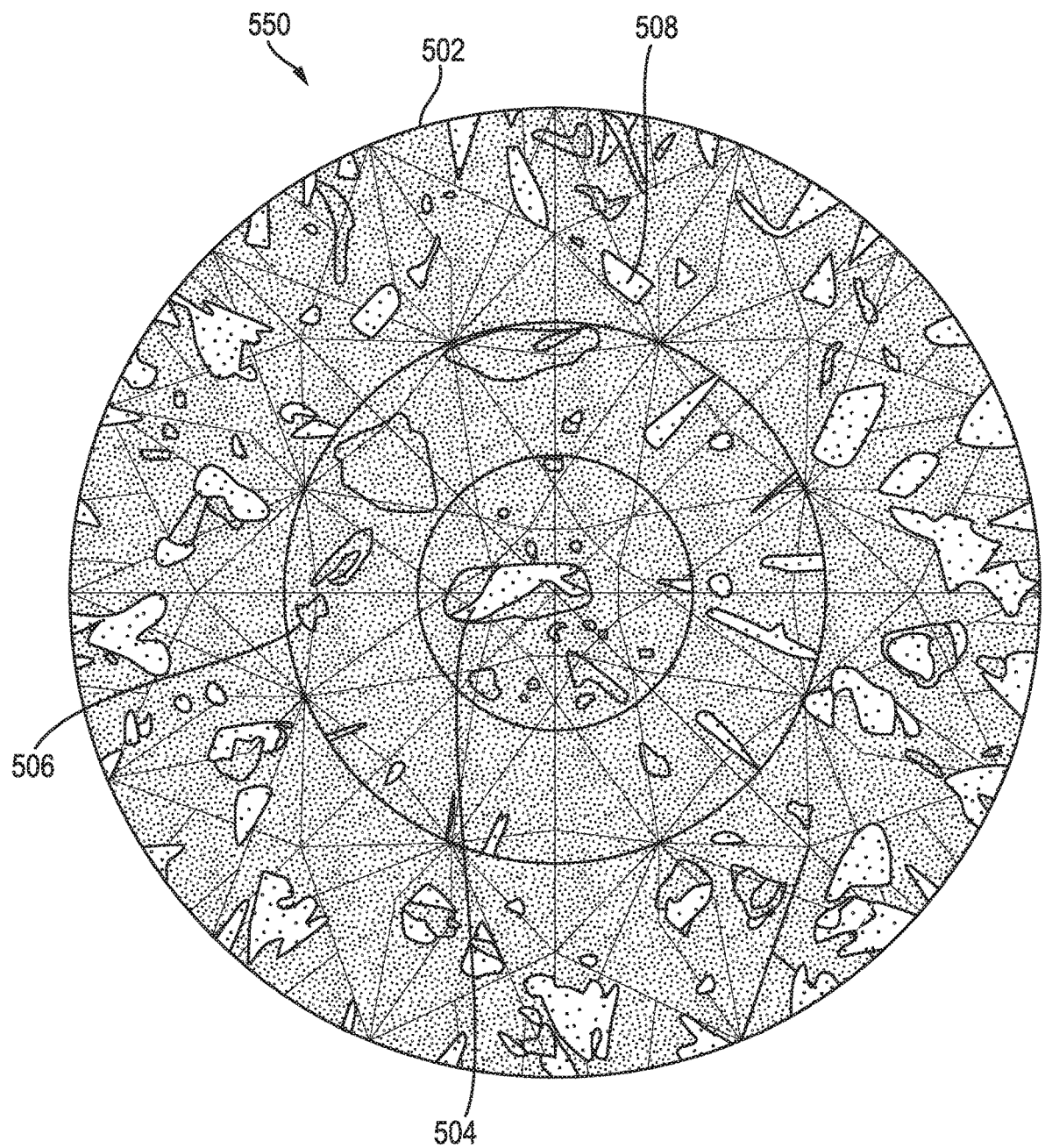

With reference to FIGS. 5A and 5B, a jewelry item and, more particularly, inclusions contained therein appear different when illuminated with different colors of ambient light. In some embodiments, images of the jewelry item can be captured with different colors of ambient light, and the analyzing 204 includes determining inclusion characteristics in the different colors of ambient light. For example, FIG. 5A shows a captured image 500 of a jewelry item 502 illuminated by a first color ambient light, such as blue light. The captured image 500 shows a shadow 504 located near the center of the jewelry item, and first and second inclusions 506 and 508.

FIG. 5B shows another captured image 550 of the same jewelry item 502 illuminated by a second color ambient light, such as red light. As can be seen in the captured image 550, the jewelry item 502 can appear darker overall in the second color ambient light. Furthermore, the shadow 504 and the first and second inclusions 506 and 508 can appear to be of different darkness in the second color ambient light as compared to their appearances in the first color ambient light. The analyzing 204 can include determining one or more color characteristics of the one or more inclusions based upon these varied appearances.

In some embodiments, the analyzing 204 includes determining whether a particular inclusion is black (e.g., a carbon impurity), white (e.g., a fissure or fracture in the jewelry item), yellowish or reddish (e.g., containing amethyst), milky, or of any other suitable color and characteristics. Additionally, in some embodiments, the analyzing 204 also includes determining a color of an inclusion relative to a color of the jewelry item, and the evaluating 206 includes determining a lower quality as the color of the inclusion differs more from the color of the jewelry item and is, therefore, more visible to an observer. The appearance of the inclusion in different colors of ambient light, as described by way of example with reference to FIGS. 5A and 5B, can be accounted for in this analysis and evaluation.

FIG. 4C shows another alternative jewelry item setup 460 that can be used to determine a color of a jewelry item and/or color characteristics of inclusions therein. A jewelry item, such as a diamond 462, typically contains inclusions 464, 466, 468, and 470. A parabolic structure 472 with first and second tubular portions 474 and 476 can allow ambient light to pass through to a culet 478 of the diamond 462. For example, a color illumination device 480 can be positioned to shine light through the first and second tubular portions 474 and 476. The color illumination device 480 can contain a light source 482 coupled to a color adjustment component 484 that is used to adjust the color of ambient light 486 emitted by the light source 482 and irradiating the diamond 462. The parabolic structure 472 and widths of the first and second tubular portions 474 and 476 can be designed as desired to control the amount of ambient light 486 that irradiates the diamond 462 or other jewelry item so as to facilitate uniform analysis of different jewelry items. Light emitted by the light source 482 that does not pass through the first and second tubular portions 474 and 476 can be reflected by the parabolic structure 472, as shown by example reflected portions of light 488 and 490. The parabolic structure 472 can be made of or covered by any suitable material, such as aluminum foil, to facilitate the irradiation of the diamond 462 or other jewelry item in the manner desired.

The step of analyzing 204 of the color of the diamond 462, the colors of any one or more of the inclusions 464-470, the colors of the inclusions 464-470 relative to the color of the diamond 462, etc. can proceed using the arrangement depicted in FIG. 4C and according to the analyzing techniques described elsewhere herein. The arrangement shown in FIG. 4C can reduce or remove shadows and reflections, and the analyzing 204 can include comparing images captured with and without the arrangement of FIG. 4C in place in order to identify characteristics of shadows and reflections. In this manner, while the shadows and reflections might appear to an observer to be inclusions, they can be identified as shadows and reflections when they are reduced or removed using the arrangement in FIG. 4C.

Figure 6A:
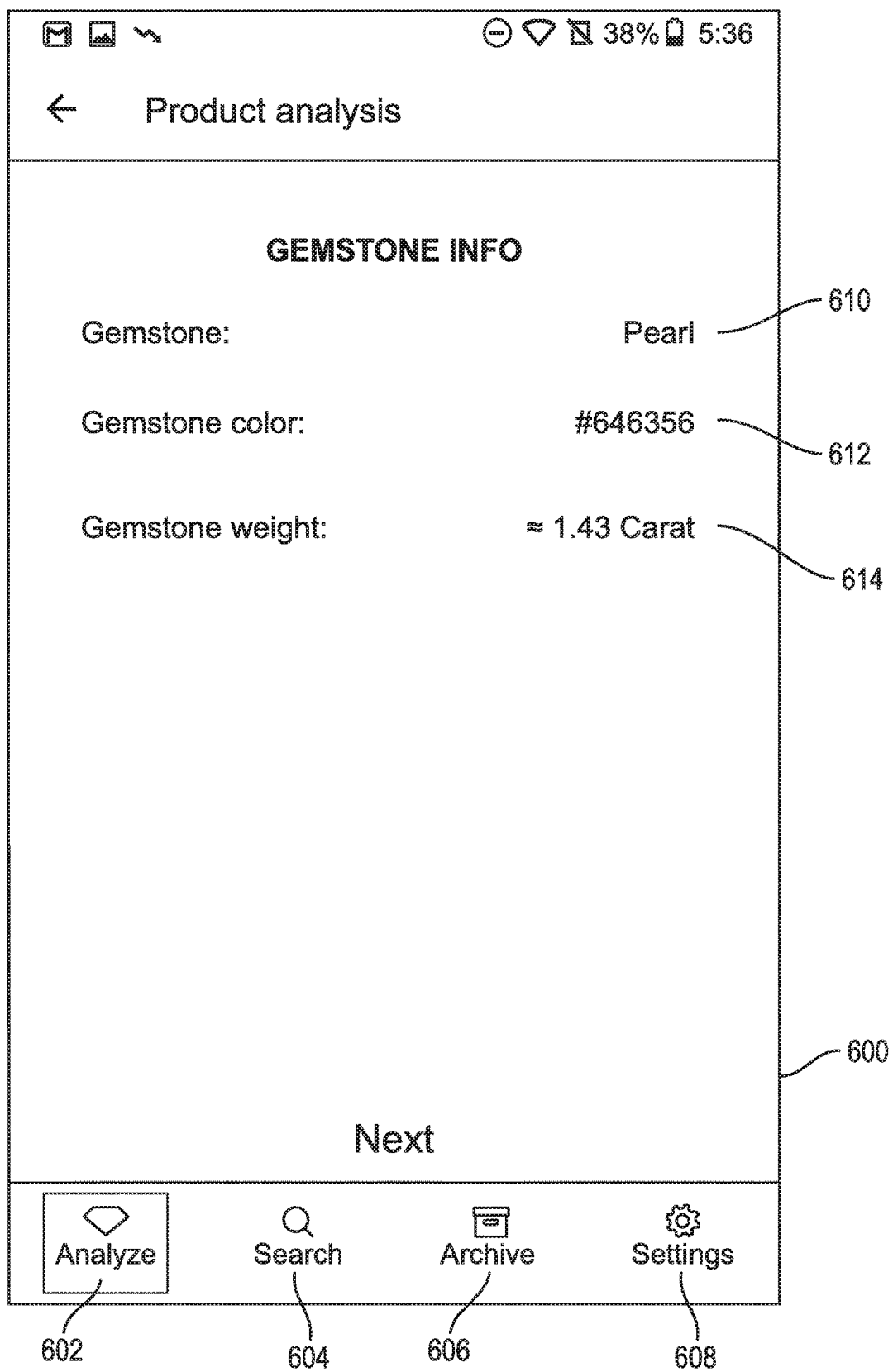
FIGS. 6A-6D are example screenshots of a mobile app for grading a jewelry item and identifying similarly graded jewelry items, according to an embodiment of the present invention.

As noted above, the functionality described herein can be provided as a suitable program such as a mobile phone app. FIG. 6A shows an example screenshot 600 of gemstone information that can result from performance of part or all of the method 200. The screenshot 600 illustrates example options for a user, including an analyze option 602 to capture an image of a jewelry item and perform analyses such as those described herein; a search option 604 to search for similar jewelry items as further described below; and additional options, such as an archive option 606 to access stored data relating to the user or to jewelry items, and a settings option 608.

The screenshot of FIG. 6A shows an example identification of the jewelry item or gemstone type 610 as a pearl, the gemstone color 612 represented numerically as 646356 (e.g., in base 10 or in hexadecimal), and the gemstone weight 614 approximated as 1.43 Carat. This information can be determined by implementation of the capturing 202 and analyzing 204 actions described herein.

Figure 6B:
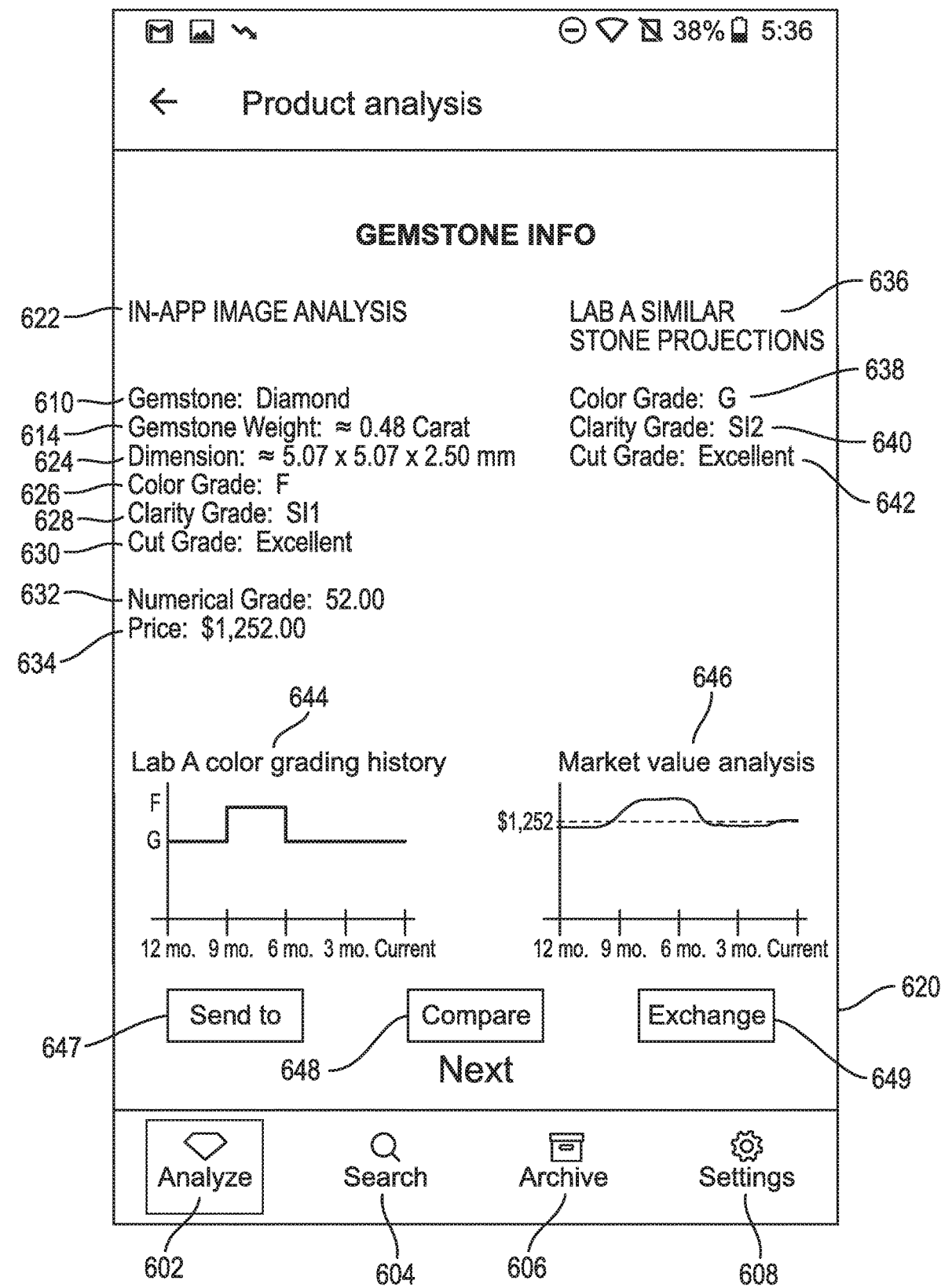

FIG. 6B shows another example screenshot 620 illustrating additional information that can result from, for example, the analyzing 204, evaluating 206, and determining 208 of a grading as described herein. An in-app image analysis section 622 can list the gemstone type 610 for a gemstone that has had one or more images thereof captured as described above. In this example, the listed gemstone type 610 might be a diamond, for instance. The in-app image analysis section 622 also lists the gemstone weight 614, which in this example might be approximately 0.48 Carat; gemstone dimensions 624 of approximately 5.07*5.07*2.50 millimeters; a gemstone color grade 626 of "F" on the GIA scale; a gemstone clarity grade 628 of "SI1" on the GIA scale; and a gemstone cut grade 630 of "Excellent" on the GIA scale. While not shown as such in FIG. 6B, other information such as gemstone shape(s), gemstone facet characteristic(s), etc. can also be displayed in the example screenshot 620 and/or in other screenshots discussed herein.

The screenshot 620 also shows that a numerical grade 632 of 52.00 has been assigned to the gemstone, which grade is assigned by the evaluating 206 and determining 208 actions described above. The example grade of 52.00 can provide an objective numerical grading by which the gemstone can be slotted into a ranking relative to other gemstones for which information is stored in a database such as the external storage 116, as further described below. In some examples, a numerical grade is given for each of one or more characteristics of the gemstone, and these numerical grades are weighted according to a set rule or standard, such as a user-defined standard, to give an overall numerical grade for the gemstone.

The screenshot 620 further shows that a price or valuation 634 can be provided for the gemstone, which in this example can be $1,252.00. By providing objective techniques to evaluate and quantify gradings of gemstones, various embodiments of the present invention allow the price or valuation 634 to be achieved despite variations in grading techniques or criteria used by grading entities. Embodiments of the mobile app described herein can indicate to a user what gradings one or more grading entities might determine for the same gemstone that has been analyzed, evaluated, and graded using the techniques described herein. For example, the mobile app can take into account information regarding grading standards used by the one or more grading entities and display determinations of how those one or more grading entities would grade the gemstone for which the in-app image analysis 622 is displayed. Information regarding the grading standards used by the one or more grading entities can be received, for example, from the external gemstone evaluation platform 118, which can be a computing device or system of a grading entity.

Thus, the screenshot 620 contains a section 636 showing projected gradings that would be issued by a particular entity (in this example, "Lab A") for the same or a similar gemstone. The Lab A color grade 638 might be determined to be a "G" whereas the in-app determined color grade 626 is "F," indicating that Lab A has determined to employ overly stringent color gradings. The Lab A clarity grade 640 might be determined to be "SI2" whereas the in-app determined clarity grade 628 is "SI1." The Lab A cut grade 642 might be determined to be "Excellent," which can be the same as the in-app cut grade 630.

The mobile app can update data for the grading entity, such as Lab A, over time and can display a history of some or all of this data. Thus, the screenshot 620 shows a Lab A color grading history 644 over 12 months, showing that between six and nine months ago, the Lab A color grading for the gemstone can have been projected to be "F," and has at other times been projected to be "G" as described in the example above.

The mobile app can also display a history of the pricing or valuation of the gemstone, such as an estimated historical market value. The screenshot 620 shows a market value analysis 646 that estimates the market value of the gemstone over the past year. It will be appreciated that the market value of the gemstone might vary with one or more gradings of the gemstone in any of a number of ways, depending on what factors affect a change in the one or more gradings and on other factors such as a change in demand for the gemstone.

As shown in FIG. 6B, further options can additionally or alternatively be present, such as a "send to" option 647 that allows a user of the mobile app to send information regarding the gemstone analyzed using the mobile app to another user of the same mobile app. The information regarding the gemstone analyzed can include, for example, some or all of the information in the screenshot 620.

The further options can also include a compare option 648 that facilitates comparison of data regarding the gemstone analyzed using the mobile app to other gemstones for which data is stored in, for example, the external data storage 116. The compare option 648 can also, when selected, cause the mobile app to identify a further gemstone similar to the gemstone that has been analyzed using the mobile app, such as in the manner discussed with respect to FIG. 6D.

The further options can also include an exchange option 649 that a user can select to access a jewelry exchange that can be implemented via the mobile app. Upon selection of the exchange option 649, the user can access functionality to list the gemstone analyzed using the mobile app for sale to other users, complete a sale of the gemstone, view gemstones listed by other users and/or businesses for sale, contact other users via any suitable messaging format or protocol, trade images of gemstones with other users, and/or any other suitable functionality. More generally, the mobile app can implement any combination of business-to-consumer, business-to-business, and peer-to-peer arrangements for buying and selling jewelry items, grading jewelry items, viewing graded jewelry items, etc. The mobile app can also allow any desired transfer of information including downloading of gemstone information by a user, printing of gemstone information and/or screenshots, emailing or other messaging of information obtained from use of the mobile app, etc.

Figure 6C:
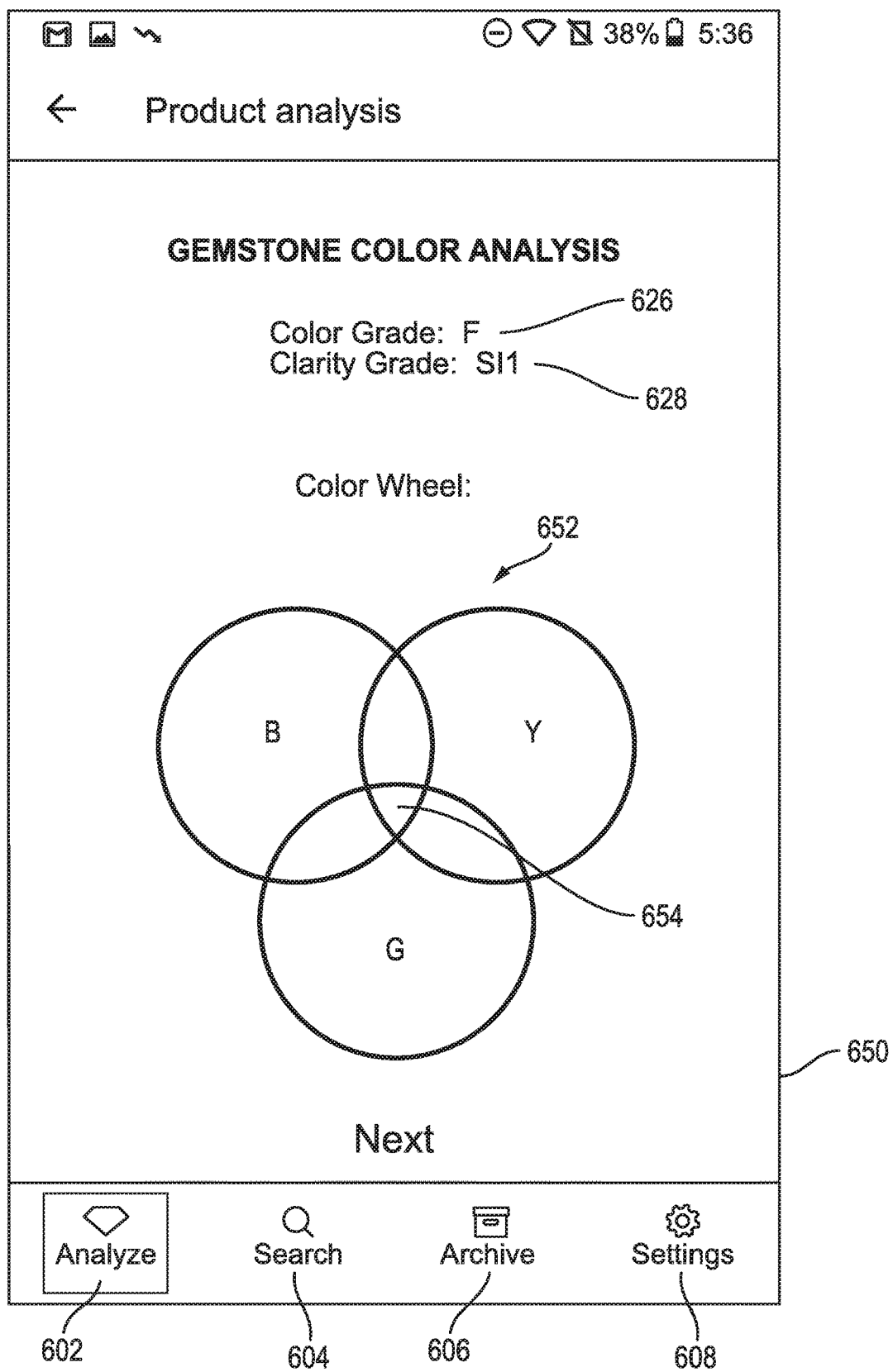

FIG. 6C shows another example screenshot 650 that can provide detailed information about the color of the gemstone, which can be determined from one or more of the analytical techniques described with reference to FIGS. 4A-4C and 5A-5B. In particular, the screenshot 650 shows a color wheel 652 for the gemstone, which can be a visual, Venn diagram-like representation of the specific color of the gemstone in terms of one or more base colors. For example, the determined color 654 of the gemstone can be a relatively even mix of blue ("B"), yellow ("Y"), and green ("G").

Figure 6D:
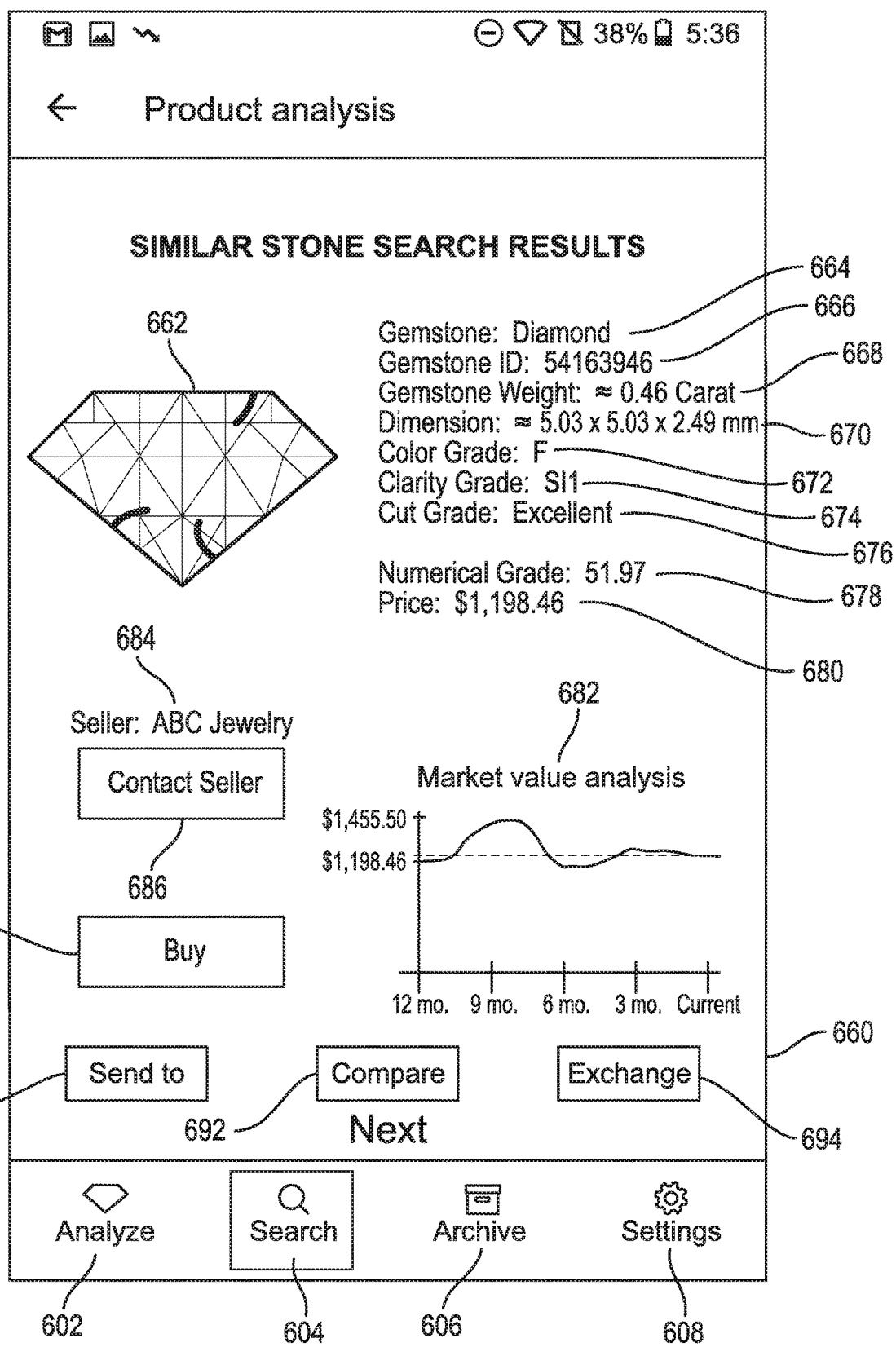

FIG. 6D shows another example screenshot 660 that can show results of a search for a gemstone similar to the one that has had an image(s) thereof captured and that has been analyzed, evaluated, and graded as discussed above with respect to FIGS. 6A-6C. As shown in FIG. 6D, the search option 604 can be selected instead of the analyze option 602 that was selected in each of FIGS. 6A-6C. The screenshot 660 includes an image of a similar gemstone 662, which might be a gemstone that has been determined to have a similar numerical grade to the numerical grade 632 of the gemstone for which the image(s) were captured. The similar gemstone 662 can also be identified based on the similar gemstone 662 having inclusion size(s), inclusion placement(s), gemstone size, gemstone weight, color characteristics, and/or any other features that are similar to the gemstone for which the image(s) were captured. For example, the similar gemstone 662 can be identified using the grid and/or string techniques described above and comparing results of calculations performed on different gemstones using these techniques.

A similar gemstone type 664 for the similar gemstone 662 can be displayed (e.g., "Diamond"). The screenshot 660 can also display a similar gemstone ID 666, which can be a numerical (e.g., base 10 or hexadecimal) identifier associated with the similar gemstone 662, such as an identifier associated with the similar gemstone 662 in the external storage 116. The screenshot 660 can also display a similar gemstone weight 668, similar gemstone dimensions 670, similar gemstone color grade 672, similar gemstone clarity grade 674, similar gemstone cut grade 676, similar gemstone numerical grade 678, and similar gemstone price 680 as shown in FIG. 6D. The similar gemstone numerical grade 678 is 51.97 in the example of FIG. 6D, as compared to the numerical grade 632 of 52.00 for the gemstone analyzed using the mobile app. The similar gemstone price 680 is $1,198.46 in the example of FIG. 6D, as compared to the price or valuation 634 of $1,252.00 for the gemstone analyzed using the mobile app.

The screenshot 660 also shows a market value analysis 682 of the similar gemstone 662, and displays an indication 684 of the seller of the similar gemstone 662 (e.g., a store selling the similar gemstone 662, designated as "ABC Jewelry" in the example of FIG. 6D), and displays a contact option 686 to contact the seller of the similar gemstone 662 (e.g., via email, in-app messaging, etc.).

As shown in FIG. 6D, further options can additionally or alternatively be present, such as a buy option 688 that starts an in-app purchase process to buy the similar gemstone 662. The further options can also include a "send to" option 690 that allows a user of the mobile app to send information regarding the similar gemstone 662 or the gemstone analyzed using the mobile app to another user of the same mobile app. The information regarding the similar gemstone can include, for example, some or all of the information in the screenshot 660. The further options can also include a compare option 692 that facilitates comparison of data regarding the similar gemstone 662 or the gemstone analyzed using the mobile app to other gemstones for which data is stored in, for example, the external data storage 116. The further options can additionally include an exchange option 694, which can provide functionality similar to the exchange option 649 described with respect to FIG. 6B.

In some embodiments, the screenshot 660 and/or other screenshots discussed herein can also or alternatively depict the gemstone for which the image(s) were captured, and can show the placement of one or more inclusions thereon. While not shown as such in FIG. 6D, other information such as shape(s) of the gemstone for which the image(s) were captured, similar gemstone shape(s), facet characteristic(s) of the gemstone for which the image(s) were captured, similar gemstone facet characteristic(s), etc. can also be displayed in the example screenshot 660.

Figure 2B:
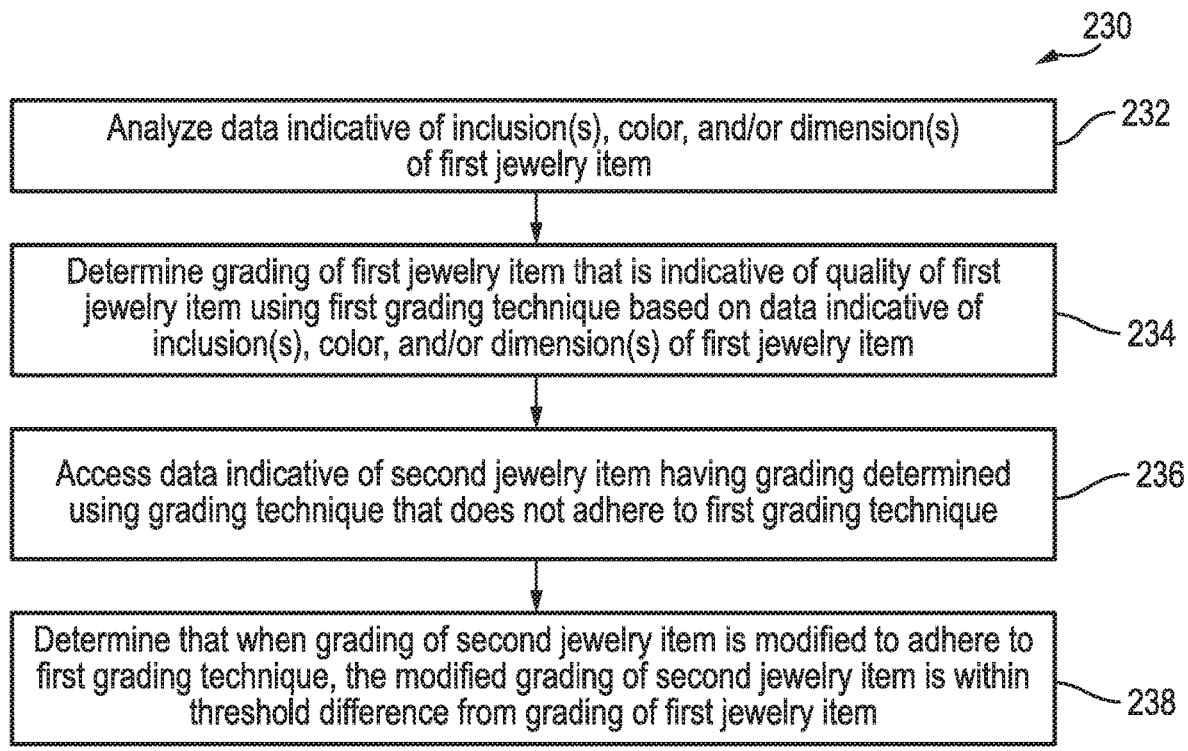
FIG. 2B is a flow chart of an example method for identifying similarly graded jewelry items, according to an embodiment of the present invention.

Referring now to FIG. 2B, a flow chart is illustrated of an example method 230 for identifying similarly graded jewelry items, according to an embodiment of the present invention. Processing begins with analyzing 232 data indicative of one or more inclusions in a first jewelry item (e.g., the gemstone 104 or another jewelry item discussed herein), a color of the first jewelry item, and/or one or more dimensions of the first jewelry item. For example, the analyzing 232 can include analyzing data from one or more captured images of the first jewelry item in the manner described with respect to FIG. 2A. In some embodiments, the analyzing 232 includes analyzing data that is also indicative of one or more shapes of the first jewelry item, one or more facets of the first jewelry item, one or more characteristics of the one or more facets, and/or any other suitable characteristics, such as when the one or more captured images indicate such characteristics.

The method 230 can also include determining 234 a grading of the first jewelry item that is indicative of a quality of the first jewelry item using a first grading technique. The first grading technique can be based on the data indicative of the one or more inclusions in the first jewelry item, the color of the first jewelry item, and/or the one or more dimensions of the first jewelry item. The first grading technique can also be based on data indicative of one or more shapes of the first jewelry item, one or more facets of the first jewelry item, one or more characteristics of the one or more facets, and/or any other suitable characteristics.

For example, the first jewelry item can be graded objectively based on such data according to one or more of the techniques described in detail above. More particularly as to taking inclusions into account, the first grading technique used for the first jewelry item can account for: (1) size of a first inclusion, (2) size of a second inclusion, (3) proximity of the first inclusion to the second inclusion, (4) proximity of one or more inclusions to an edge of the first jewelry item, (5) visibility of one or more inclusions in different colors of light (e.g., as described with reference to FIGS. 4B, 4C, 5A, and 5B), (6) a difference between the color of an inclusion and a color of the first jewelry item, or (7) a combination of the foregoing. In some embodiments, the first grading technique can assign a numerical grade to the first jewelry item, such as a numerical grade between 0 and 100 as discussed above.

The method 230 can additionally include accessing 236, from a remote computing device such as the external storage 116 and/or the external gemstone evaluation platform 118, data indicative of a second jewelry item having a grading that is indicative of a quality of the second jewelry item and that is determined using a second grading technique. According to an embodiment of the present invention, the second grading technique does not adhere to the first grading technique. For example, the first grading technique can be employed by a mobile app and can objectively take into account various characteristics of a jewelry item and inclusions, as described above. The second grading technique can be a grading technique that is used by a different entity and about which information is available via the external gemstone evaluation platform 118. In various embodiments, the second grading technique assigns gradings to jewelry items that are subjective and/or changing over time, and that can be quantitatively and/or qualitatively lower or higher than gradings assigned using the first grading technique.

The method 230 can further include determining 238 that when the grading of the second jewelry item is modified to adhere to the first grading technique (e.g., converted to a numerical grading between 0 and 100 according to the first grading technique), the modified grading of the second jewelry item is within a threshold difference from the grading of the first jewelry item. In this manner, the method 230 can compensate for differences in grading techniques to produce a determination that the second jewelry item is considered similar in quality to the first jewelry item. The threshold difference can be, for example, a numerical difference in grading that can be predetermined by default or specified by a user of the mobile app.

More particularly, the determining 238 can include determining that modifying the grading of the second jewelry item so that size, placement, and/or color characteristics of an inclusion(s) in the second jewelry item are accounted for according to the first grading technique results in the modified grading being within the threshold difference from the grading of the first jewelry item.

FIGS. 7A-7C illustrate example slottings, or rankings, of jewelry items relative to one another that result from implementing techniques described herein, according to an embodiment of the present invention. FIG. 7A shows an example slotting 700 of gemstones that includes a gemstone listing 702, a numerical grade listing 704, and a price listing 706. In the example of FIG. 7A, six gemstones designated with the identifiers A through F are shown in descending order of numerical gradings assigned using the techniques described herein.

In some embodiments, one or more of the numerical gradings of gemstones A through F comprise modified gradings. That is, one or more of the numerical gradings of gemstones A through F might be the result of modifying gradings done by other entities to adhere to the techniques described above with respect to, for example, FIG. 2A. Example prices or market values of gemstones A through F, as determined using the functionality described herein, are also shown in the price listing 706. The slotting 700, and other slottings described herein, is available for display to a user of the mobile app, or in other embodiments can represent information stored by or accessible to the mobile app, e.g., information stored in the external storage 116.

The slotting 700, and other slottings described herein, can be electronically sent or re-sent to the user any time an update to information in the slotting 700 occurs. In other examples, the user can also or alternatively request an update to the slotting 700, such as through a suitable option added to one of the screenshots described herein or to another user interface. In other examples, the user can also or alternatively specify a threshold amount by which any information shown in the slotting 700 needs to change (e.g., a threshold price change) in order for the slotting 700 to be electronically re-sent to the user.

It will be appreciated as well that any updates to an original slotting of a particular gemstone in view of later slottings can be maintained in the database and referenced when there is a need to confirm the rating of that stone or item of jewelry. For instance, at the time of a transfer from one owner to another, a previously rated gemstone or jewelry item can be referenced in the database for its current slot in relation to all gemstones and items that have been rated by the system.

FIG. 7B illustrates another example slotting 730. In FIG. 7B, three additional gemstones designated with the identifiers G through I have been added to the gemstone listing 702. For example, gemstones G through I can have had images thereof captured and have been analyzed and graded in accordance with the techniques described above. The numerical grade of gemstone B has been dynamically updated from 52.00 as shown in FIG. 7A to 51.97 as shown in FIG. 7B, while the added gemstone G has been given the numerical grade of 52.00 in FIG. 7B. In this manner, the slotting 730 of FIG. 7B ranks the gemstones A through I relative to one another using dynamically updated gradings to slot newly graded gemstones.

FIG. 7C illustrates yet another example slotting 760. In FIG. 7C, the numerical grades in the numerical grade listing 704 for gemstones A through F are updated relative to those shown in FIG. 7A. This updating of numerical grades might occur in response to an objective change in how factors such as those described herein influence the grading of jewelry items. For example, this updating of numerical grades can occur in response to a change in how color of an inclusion relative to color of the gemstone containing the inclusion impacts the numerical grading of a gemstone.

The methods described herein can be performed in part or in full by software or firmware in machine readable form on a tangible (e.g., non-transitory) storage medium. For example, the software or firmware can be in the form of a computer program including computer program code adapted to perform some or all of the steps of any of the methods described herein when the program is run on a computer or suitable hardware device (e.g., FPGA), and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media, but propagated signals by themselves are not examples of tangible storage media. The software can be suitable for execution on a parallel processor or a serial processor such that the method steps can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

What is claimed is:

1. A method for grading a jewelry item, the method comprising:
    capturing, using an image capturing device, an image of the jewelry item;
    analyzing, using a processing unit, the image of the jewelry item to identify, within the image, at least one of: one or more inclusions in the jewelry item, one or more colors of the jewelry item, and one or more dimensions of the jewelry item;
    evaluating, using the processing unit, a quality of the jewelry item based on at least a subset of features including: one or more sizes of the one or more inclusions, one or more placements of the one or more inclusions, one or more color characteristics of the one or more inclusions, the color of the jewelry item, and the one or more dimensions of the jewelry item, wherein the evaluating step takes into account at least two of the following: the one or more sizes of the one or more inclusions, the one or more placements of the one or more inclusions, and the one or more color characteristics of the one or more inclusions; and
    determining, using the processing unit, a grading of the jewelry item in which the quality of the jewelry item is quantified in relation to a plurality of additional gradings concerning a corresponding plurality of additional jewelry items, wherein the quantified grading is calculated with regard to differences in the evaluated quality of the subset of features of each respective jewelry item.

2. The method of claim 1, wherein the one or more color characteristics of the one or more inclusions include a visibility of one of the one or more inclusions in a first color light and a visibility of the one inclusion in a second color light.

3. The method of claim 1, wherein the one or more color characteristics of the one or more inclusions include a difference between a color of one of the one or more inclusions and a color of the jewelry item.

4. The method of claim 1, wherein the evaluating step takes into account the one or more placements of the one or more inclusions by taking into account at least one of the following: a proximity of a first one of the one or more inclusions to a second one of the one or more inclusions, a proximity of at least one of the first inclusion or the second inclusion to an edge of the jewelry item, and a proximity of at least one of the first inclusion or the second inclusion to a portion of the jewelry item that will be obscured during use of the jewelry item.

5. The method of claim 1, wherein the evaluating step includes:
    representing at least a portion of the jewelry item within a grid; and
    determining at least one of the one or more sizes of the one or more inclusions or the one or more placements of the one or more inclusions based on at least one of a number of subsections of the grid covered by the one or more inclusions or a proximity of subsections of the grid covered by the one or more inclusions.

6. The method of claim 1, wherein the evaluating step includes:
representing one or more characteristics of each of at least two of the one or more inclusions using a first numerical string and a second numerical string, respectively; and
performing calculations using the first numerical string and the second numerical string as part of the step of evaluating the quality of the jewelry item.

7. The method of claim 1, wherein the jewelry item is a first jewelry item, the method further comprising analyzing the plurality of additional gradings to identify a second jewelry item from among the plurality of additional jewelry items as being a jewelry item that is similar to the first jewelry item.

8. A method for grading a jewelry item, the method comprising:
capturing, using an image capturing device, an image of the jewelry item;
analyzing, using a processing unit, the image of the jewelry item to identify, within the image, at least one of: one or more inclusions in the jewelry item, one or more colors of the jewelry item, and one or more dimensions of the jewelry item;
evaluating, using the processing unit, a quality of the jewelry item based on at least a subset of features including: one or more sizes of the one or more inclusions, one or more placements of the one or more inclusions, one or more color characteristics of the one or more inclusions, the color of the jewelry item, and the one or more dimensions of the jewelry item; and
determining, using the processing unit, a grading of the jewelry item in which the quality of the jewelry item is quantified in relation to a plurality of additional gradings concerning a corresponding plurality of additional jewelry items, wherein the quantified grading is calculated with regard to differences in the evaluated quality of the subset of features of each respective jewelry item,
wherein the determining step includes updating at least one of the plurality of additional gradings concerning the plurality of additional jewelry items based on the grading of the jewelry item.

9. A system for grading a jewelry item, the system comprising:
an image capturing device configured to capture an image of the jewelry item;
an external storage component configured to store data corresponding to the image of the jewelry item and of a plurality of additional jewelry items; and
a processing unit configured to:
analyze the image of the jewelry item to identify, within the image, at least one of one or more inclusions in the jewelry item, a color of the jewelry item, and one or more dimensions of the jewelry item;
evaluate a quality of the jewelry item based on at least a subset of features including: one or more sizes of the one or more inclusions, one or more placements of the one or more inclusions, one or more color characteristics of the one or more inclusions, the color of the jewelry item, and the one or more dimensions of the jewelry item, wherein the processing unit is configured to take into account at least two of the following to evaluate the quality of the jewelry item: the one or more sizes of the one or more inclusions, the one or more placements of the one or more inclusions, and the one or more color characteristics of the one or more inclusions;
access, from the external storage component, data indicative of at least one of: one or more inclusions in the plurality of additional jewelry items, one or more colors of the plurality of additional jewelry items, and one or more dimensions of the plurality of additional jewelry items in order to determine a plurality of additional gradings of the plurality of additional jewelry items; and
determine a grading of the jewelry item that quantifies the evaluated quality of the jewelry item in relation to the plurality of additional gradings each concerning the plurality of additional jewelry items, wherein the quantified grading is calculated with regard to differences in the evaluated quality of the subset of features of each respective jewelry item.

10. The system of claim 9, wherein the one or more color characteristics of the one or more inclusions include a visibility of one of the one or more inclusions in a first color light and a visibility of the one inclusion in a second color light.

11. The system of claim 9, wherein the one or more color characteristics of the one or more inclusions include a difference between a color of one of the one or more inclusions and a color of the jewelry item.

12. The system of claim 9, wherein the processing unit is configured to take into account at least one of the following so as to take into account the one or more placements of the one or more inclusions: a proximity of a first one of the one or more inclusions to a second one of the one or more inclusions, a proximity of at least one of the first inclusion or the second inclusion to an edge of the jewelry item, and a proximity of at least one of the first inclusion or the second inclusion to a portion of the jewelry item that will be obscured during use of the jewelry item.

13. The system of claim 9, wherein the processing unit is configured to:
represent at least a portion of the jewelry item within a grid; and
determine at least one of the one or more sizes of the one or more inclusions or the one or more placements of the one or more inclusions based on at least one of a number of subsections of the grid covered by the one or more inclusions or a proximity of subsections of the grid covered by the one or more inclusions.

14. The system of claim 9, wherein the jewelry item is a first jewelry item, and wherein the processing unit is configured to analyze the plurality of additional gradings to identify a second jewelry item from among the plurality of additional jewelry items as being a jewelry item that is similar to the first jewelry item.

15. A system for grading a jewelry item, the system comprising:
an image capturing device configured to capture an image of the jewelry item;
an external storage component configured to store data corresponding to the image of the jewelry item and of a plurality of additional jewelry items; and
a processing unit configured to:
analyze the image of the jewelry item to identify, within the image, at least one of one or more inclusions in the jewelry item, a color of the jewelry item, and one or more dimensions of the jewelry item;
evaluate a quality of the jewelry item based on at least a subset of features including: one or more sizes of the one or more inclusions, one or more placements of the one or more inclusions, one or more color characteristics of the one or more inclusions, the color of the jewelry item, and the one or more dimensions of the jewelry item;

access, from the external storage component, data indicative of at least one of: one or more inclusions in the plurality of additional jewelry items, one or more colors of the plurality of additional jewelry items, and one or more dimensions of the plurality of additional jewelry items in order to determine a plurality of additional gradings of the plurality of additional jewelry items; and determine a grading of the jewelry item that quantifies the evaluated quality of the jewelry item in relation to the plurality of additional gradings each concerning the plurality of additional jewelry items, wherein the quantified grading is calculated with regard to differences in the evaluated quality of the subset of features of each respective jewelry item; and wherein the processing unit is configured to update at least one of the plurality of additional gradings concerning the plurality of additional jewelry items based on the grading of the jewelry item.

16. A method for identifying similarly graded jewelry items, the method comprising:

analyzing, using a processing unit, data indicative of at least one of: one or more inclusions in a first jewelry item, a color of the first jewelry item, and one or more dimensions of the first jewelry item;

determining, using the processing unit, a grading of the first jewelry item that is indicative of a quality of the first jewelry item using a first grading technique that is based on the data indicative of the at least one of the one or more inclusions in the first jewelry item, the color of the first jewelry item, and the one or more dimensions of the first jewelry item;

accessing, from a remote computing device, data indicative of a second jewelry item having a grading that is indicative of a quality of the second jewelry item and that is determined using a second grading technique that does not adhere to the first grading technique; and determining, using the processing unit, that when the grading of the second jewelry item is modified to adhere to the first grading technique, the modified grading of the second jewelry item that adheres to the first grading technique is within a threshold difference from the grading of the first jewelry item, wherein determining that the modified grading of the second jewelry item is within the threshold difference from the grading of the first jewelry item includes: determining that modifying the grading of the second jewelry item, such that at least one of size, placement, or color characteristics of one or more inclusions in the second jewelry item are accounted for according to the first grading technique, results in the modified grading of the second jewelry item being within the threshold difference from the grading of the first jewelry item.

17. A method for identifying similarly graded jewelry items, the method comprising:

analyzing, using a processing unit, data indicative of at least one of: one or more inclusions in a first jewelry item, a color of the first jewelry item, and one or more dimensions of the first jewelry item;

determining, using the processing unit, a grading of the first jewelry item that is indicative of a quality of the first jewelry item using a first grading technique that is based on the data indicative of the at least one of the one or more inclusions in the first jewelry item, the color of the first jewelry item, and the one or more dimensions of the first jewelry item;

accessing, from a remote computing device, data indicative of a second jewelry item having a grading that is indicative of a quality of the second jewelry item and that is determined using a second grading technique that does not adhere to the first grading technique; and determining, using the processing unit, that when the grading of the second jewelry item is modified to adhere to the first grading technique, the modified grading of the second jewelry item that adheres to the first grading technique is within a threshold difference from the grading of the first jewelry item, wherein determining the grading of the first jewelry item takes into account at least one of the following: a size of a first one of the one or more inclusions in the first jewelry item, a proximity of the first inclusion to a second one of the one or more inclusions in the first jewelry item, a proximity of at least one of the first inclusion or the second inclusion to an edge of the first jewelry item, a visibility of the first inclusion in a first color light, a visibility of the first inclusion in a second color light, and a difference between a color of the first inclusion and a color of the first jewelry item.

* * * * *